US011897101B2

(12) United States Patent
Harris et al.

(10) Patent No.: US 11,897,101 B2
(45) Date of Patent: Feb. 13, 2024

(54) FLEXIBLE IMPLEMENT POSITIONER

(71) Applicant: Government of the United States as represented by the Secretary of the Air Force, Kirtland AFB, NM (US)

(72) Inventors: John Richardson Harris, Albuquerque, NM (US); Rufus Cooksey, Albuquerque, NM (US)

(73) Assignee: Government of the United States as represented by the Secretary of the Air Force, Kirtland AFB, NM (US)

(*) Notice: Subject to any disclaimer, the term of this patent is extended or adjusted under 35 U.S.C. 154(b) by 676 days.

(21) Appl. No.: 16/929,049

(22) Filed: Jul. 14, 2020

(65) Prior Publication Data

US 2020/0346332 A1 Nov. 5, 2020

Related U.S. Application Data

(62) Division of application No. 16/149,688, filed on Oct. 2, 2018, now Pat. No. 10,710,224.

(60) Provisional application No. 62/652,785, filed on Apr. 4, 2018.

(51) Int. Cl.
*B25B 27/28* (2006.01)

(52) U.S. Cl.
CPC .................................... *B25B 27/28* (2013.01)

(58) Field of Classification Search
CPC ........... B25B 27/28; B25B 27/10; F16L 23/06
See application file for complete search history.

(56) References Cited

U.S. PATENT DOCUMENTS

| | | | | |
|---|---|---|---|---|
| 2,778,661 A * | 1/1957 | Leighton | F16L 27/1133 | 464/88 |
| 2,801,116 A * | 7/1957 | Herman | F16L 23/04 | 285/365 |
| 6,694,586 B1 * | 2/2004 | Goop | B21D 39/046 | 29/272 |
| 8,782,863 B2 * | 7/2014 | Pfeiffer | B25B 27/10 | 29/272 |
| 10,710,224 B1 * | 7/2020 | Harris | B25B 27/28 | |
| 11,110,553 B2 * | 9/2021 | McClure | B23K 37/0533 | |
| 11,458,571 B2 * | 10/2022 | Rajagopalan | B23K 26/282 | |
| 2013/0025101 A1 * | 1/2013 | Pfeiffer | B25B 27/10 | 29/237 |

(Continued)

FOREIGN PATENT DOCUMENTS

| | | | |
|---|---|---|---|
| KR | 20140079016 A * | 12/2012 | |
| WO | WO-2016062515 A1 * | 4/2016 | B21D 39/048 |

*Primary Examiner* — Bayan Salone
(74) *Attorney, Agent, or Firm* — David L. Narciso; AFNWC/JA

(57) ABSTRACT

A flexible implement positioner that is lockably installable around abutting flanges of abutting tubes enables an implement, such as a temperature gauge, to be desirably positioned near the joint between the abutting flanges and enable the implement to monitor the joint between the flanges. The implement positioner includes a plurality of body segments hingedly connected to one another in an end to end relationship, with one end including a lock body segment and the opposite end including a lock body segment having a lock lever hingedly mounted thereon, the lock lever positionable in engagement with the lock body segment and pivotal to lockably engage the lock lever when installing the implement positioner on one of the flanges.

4 Claims, 31 Drawing Sheets

(56) References Cited

U.S. PATENT DOCUMENTS

| | | | | |
|---|---|---|---|---|
| 2013/0327412 | A1* | 12/2013 | DeGeorge | F17D 3/00 137/15.01 |
| 2017/0036309 | A1* | 2/2017 | McClure | B23K 37/0533 |
| 2020/0346332 | A1* | 11/2020 | Harris | B25B 27/10 |

* cited by examiner

FLEXIBLE IMPLEMENT POSITIONER

CROSS REFERENCE TO RELATED APPLICATIONS

Pursuant to 37 C.F.R. § 1.78(a)(4), this application is a divisional of application Ser. No. 16/149,688, filed Oct. 2, 2018, which claims the benefit of and priority to prior filed U.S. Provisional Application No. 62/652,785 filed Apr. 4, 2018, entitled Vacuum System Assembly Tool, incorporated by reference herein in its entirety.

GOVERNMENT INTEREST

The invention described herein may be manufactured and used by or for the Government of the United States for all governmental purposes without the payment of any royalty.

FIELD OF THE INVENTION

This invention relates to the field of positioning devices. More particularly, this invention relates to devices for positioning objects, such as gaskets, relative to a cylindrical body, such as abutting ends of piping or tubing, to hold the gasket in a desired position as the tubing ends are joined together to form a joint with the gasket sealing the joint. The devices may have other uses for holding and positioning objects, such as locating workpieces together during welding or the like.

BACKGROUND OF THE INVENTION

There is a need in the art for devices for holding a flat ring, such as a gasket or washer or the like, in place for installation of the flat ring at the end of a cylindrical body, such as a tube. Typical to such installations is the location of a gasket to seal between the juncture of tubing joints. The proper location and positioning of such gaskets is particularly important in applications such as ultra-high vacuum systems.

Ultra-high vacuum systems are generally assembled from metal tubes connected with ConFlat or CF type flanges and soft usually metal gaskets, typically made of copper. The flanges incorporate knife edges which bite into the copper gaskets, forming a continuous metal envelope for the vacuum system. CF flanges are sexless with both abutting flanges being identical.

The seal structure is a knife-edge that is machined below the flat surface of the flange. Bolts are used to tighten the flange pair together. As the bolts of the flange pair are tightened, the knife-edges make annular grooves on each side of the soft metal gasket. The extruded metal fills all the machining marks and surface defects in the flange, yielding a leak-tight seal.

When assembling these systems, it is essential that the gasket be properly seated in the flange. If this is not done, a leak will form at that location, preventing the vacuum system from reaching its desired pressure.

Under certain circumstances, it can be very difficult to accomplish this. For example, when connecting two horizontal sections of pipe, the gasket must be placed on the knife edge of one flange, and then the second flange brought close enough so that its knife edge also touches the gasket to hold it in place while the flanges are bolted together. With the flanges in this configuration, the distance between them is much smaller than a person's fingers or most tools. And yet before the flanges are brought to this configuration, fingers or tools are needed to hold the gasket in place. Accordingly, the gasket often falls out of position as the flanges are brought together, leading to much frustration and lost time in the assembly of vacuum systems.

The present invention addresses the foregoing issues and advantageously provides a tool for positioning a flat ring for installation of the flat ring at the end of a cylindrical body. The tool is particularly useful for the installation of gaskets between CF flanges. The tool is configured as a collar that is placed around one of the flanges, with fingers that extend to contact the outer rim of the gasket. The collar is placed around the flange, and the fingers hold the gasket in place until the second flange is moved into position and is bolted finger-tight to the first flange. At this point, the two flanges hold the gasket in place, and the collar is removed.

In addition, there is frequently a need to attach additional components, such as temperature gauges, lights, and optical components, to the outside of vacuum systems. It is often desired that these components be attached for long periods of time, but also to retain the ability to quickly move them to a different location on the vacuum system. Accordingly, a device adapted for convenient and reliable mounting of implements, such as temperature gauges and the like is desired.

The present invention addresses this need by providing a flexible implement positioner securably positionable about a juncture of two abutting tubes having abutting flanges. The implement positioner is lockably installable around the abutting flanges of the abutting tubes. The positioner includes one or more implement mounts located to enable an implement received by an implement mount to be desirably positioned at the joint between the abutting flanges.

The implement positioner may also be configured for placement at other locations along a tube, and not at a joint to enable desired positioning of implements along a tube or the like.

SUMMARY OF THE INVENTION

The above and other needs are met by a tool for positioning a flat ring for installation of the flat ring at the end of a cylindrical body.

In one aspect, the tool includes a plurality of body segments each having an inner concave surface, a first finger located adjacent a first side of the inner concave surface and extending perpendicular to and away from the inner concave surface, and a second finger located adjacent an opposite second side of the inner concave surface and extending perpendicular to and away from the inner concave surface parallel to and spaced apart from the first finger. The body segments are hingedly connected to one another with the first fingers aligned with one another and the second fingers aligned with one another. A proximal one of the body segments has a lock surface and a distal one of the body segments has a lock lever hingedly mounted thereon. The lock lever is positionable in engagement with the lock surface and pivotal to lockably engage the lock lever with the lock surface;

During installation of the flat ring at the end of the cylindrical body with the flat ring positioned at the end of the cylindrical body, the tool is positionable so that the lock lever is lockably engaged with the lock surface and the body segments are located to surround the end of the cylindrical body, with the first fingers bearing against the flat ring and the second fingers bearing against the cylindrical body so that the flat ring is maintained at the end of the cylindrical body by the tool.

In another aspect, the disclosure provides a method of positioning a flat ring for installation of the flat ring adjacent an end of a first cylindrical body. The method includes the steps of: providing a flat ring positioning tool having a plurality of body segment. Each body segment has an inner concave surface, a first finger located adjacent a first side of the inner concave surface and extending perpendicular to and away from the inner concave surface, and a second finger located adjacent an opposite second side of the inner concave surface and extending perpendicular to and away from the inner concave surface parallel to and spaced apart from the first finger, the body segments being hingedly connected to one another with the first fingers aligned with one another and the second fingers aligned with one another. A distal one of the body segments is lockable to a proximal one of the body segments to secure the flat ring positioning tool about the first tube.

The method further includes positioning the flat ring adjacent an end of the first cylindrical body; locating the positioning tool about the first cylindrical body and locating the flat ring positioned adjacent the end of the first cylindrical body so that the body segments of the positioning tool are located to surround the end of the first cylindrical body, with the first fingers supporting the flat ring and the second fingers bearing against the first cylindrical body; locking the distal one of the body segments to the proximal one of the body segments to lock the positioning tool on the first cylindrical body with the flat ring maintained at the end of the first cylindrical body by the positioning tool; securing the flat ring to the end of the first cylindrical body; and unlocking the positioning tool and removing it from the first cylindrical body and the flat ring.

In a further aspect, the disclosure provides a flexible implement positioner securably positionable about a juncture of two abutting tubes having abutting flanges. The implement positioner includes a plurality of body segments each having an inner concave surface hingedly connected to one another. A proximal one of the body segments has a lock surface and a distal one of the body segments has a lock lever hingedly mounted thereon. The lock lever is positionable in engagement with the lock surface and pivotal to lockably engage the lock lever with the lock surface. The implement positioner also includes an implement mount extending outwardly from one or more of the body segments.

The implement positioner is installable around the cylindrical body by encircling the body segments around the abutting flanges of the abutting tubes with the inner concave surface of each body segment engageable with both of the flanges of the abutting tubes and the implement positioner is lockably secured around the abutting flanges by engaging the lock lever with the lock surface to secure the body segments about the abutting flanges with the implement mount extending outwardly from the abutting flanges.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

Figure 1:
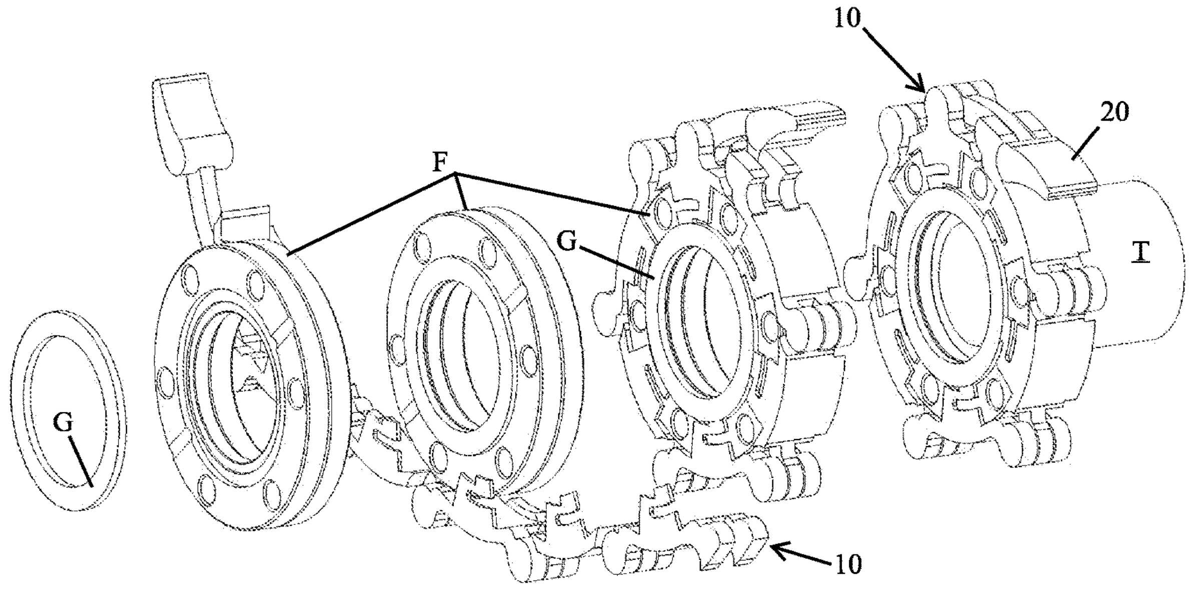
FIG. 1 shows a tool according to the disclosure and depicts its use in positioning a flat ring at the end of a cylindrical body.
Figure 2:
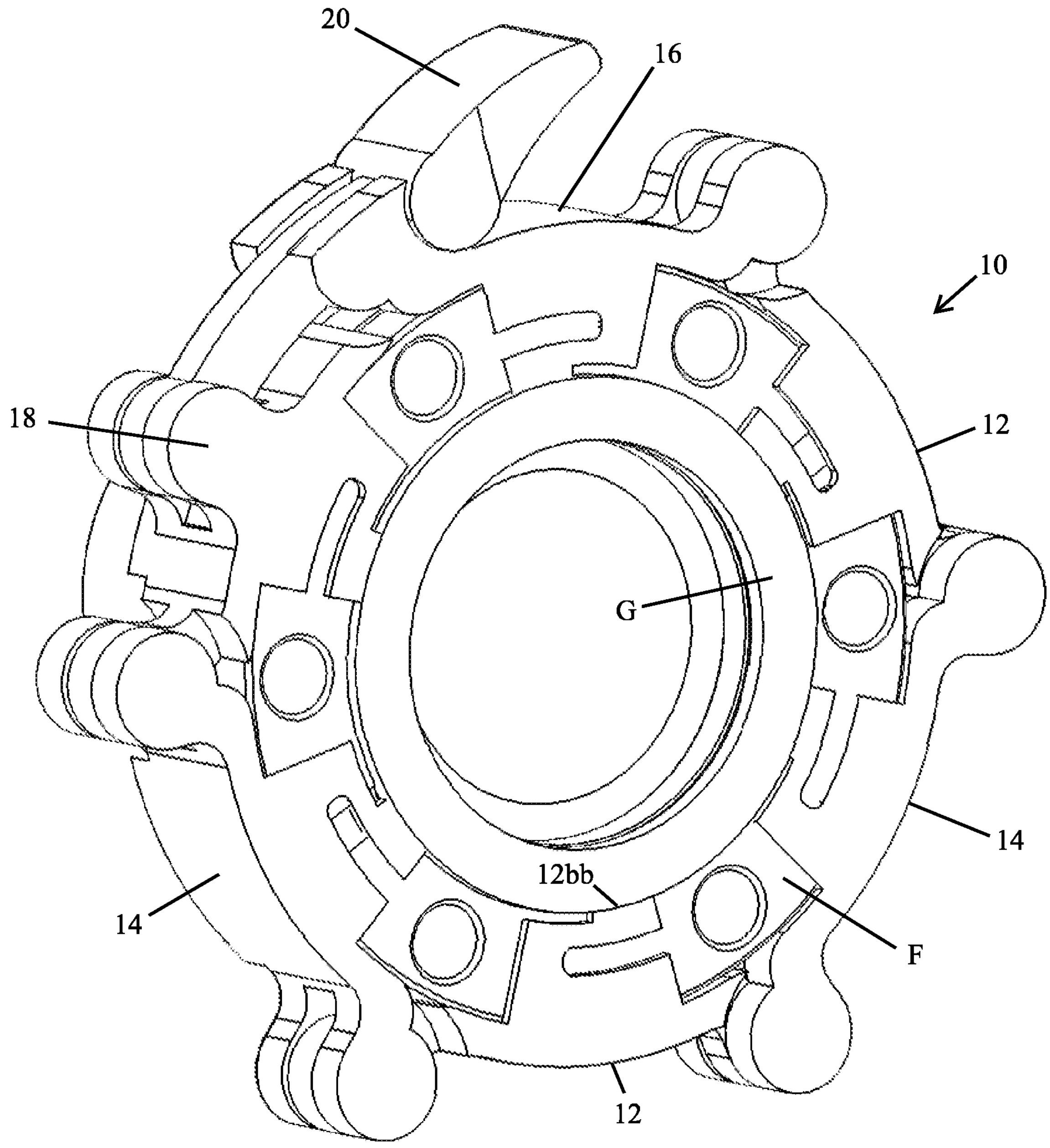
FIGS. 2 and 3 are perspective views showing the tool of FIG. 1 in use for positioning a flat ring at the end of a cylindrical body.
Figure 3:
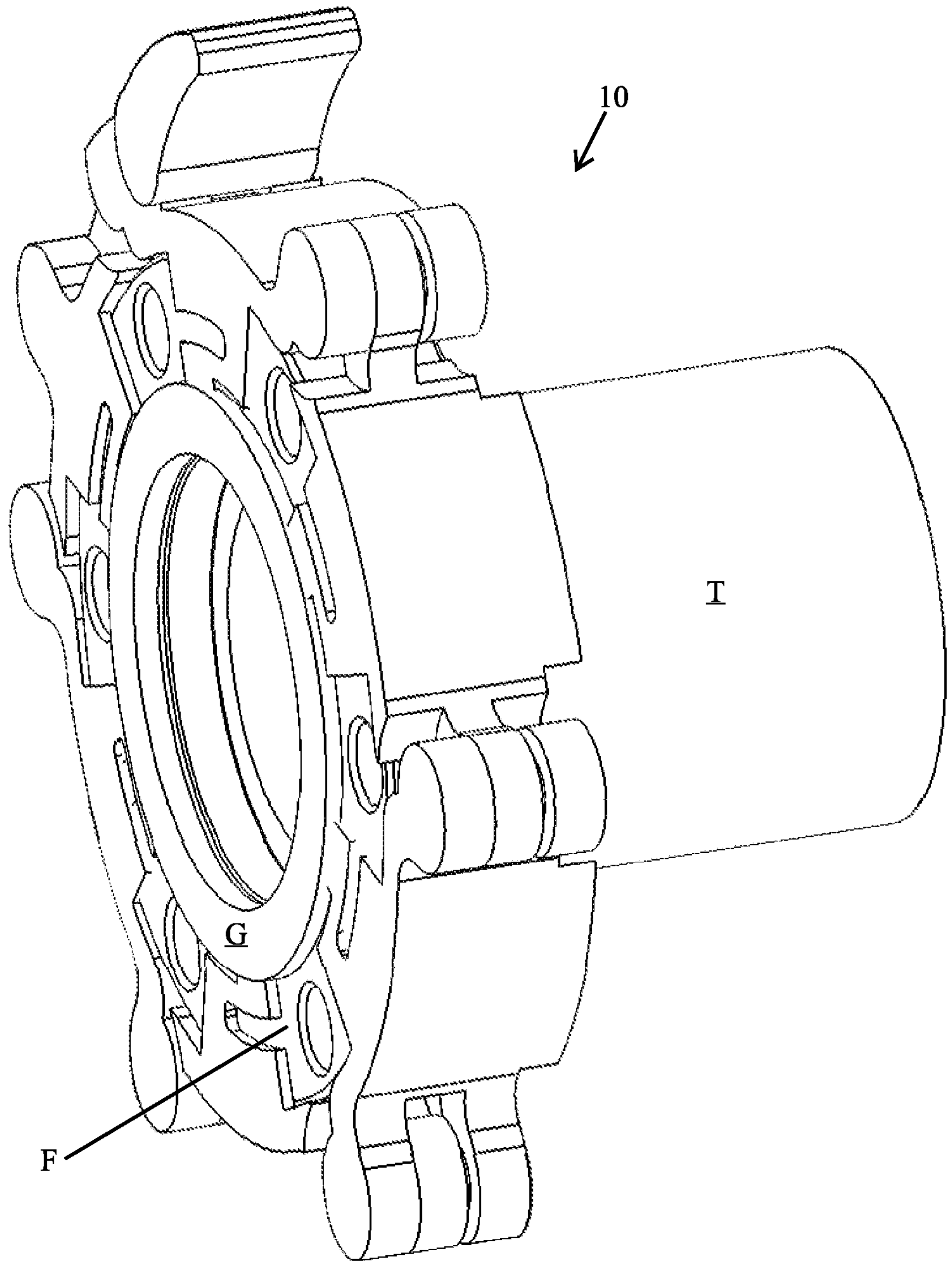
Figure 4:
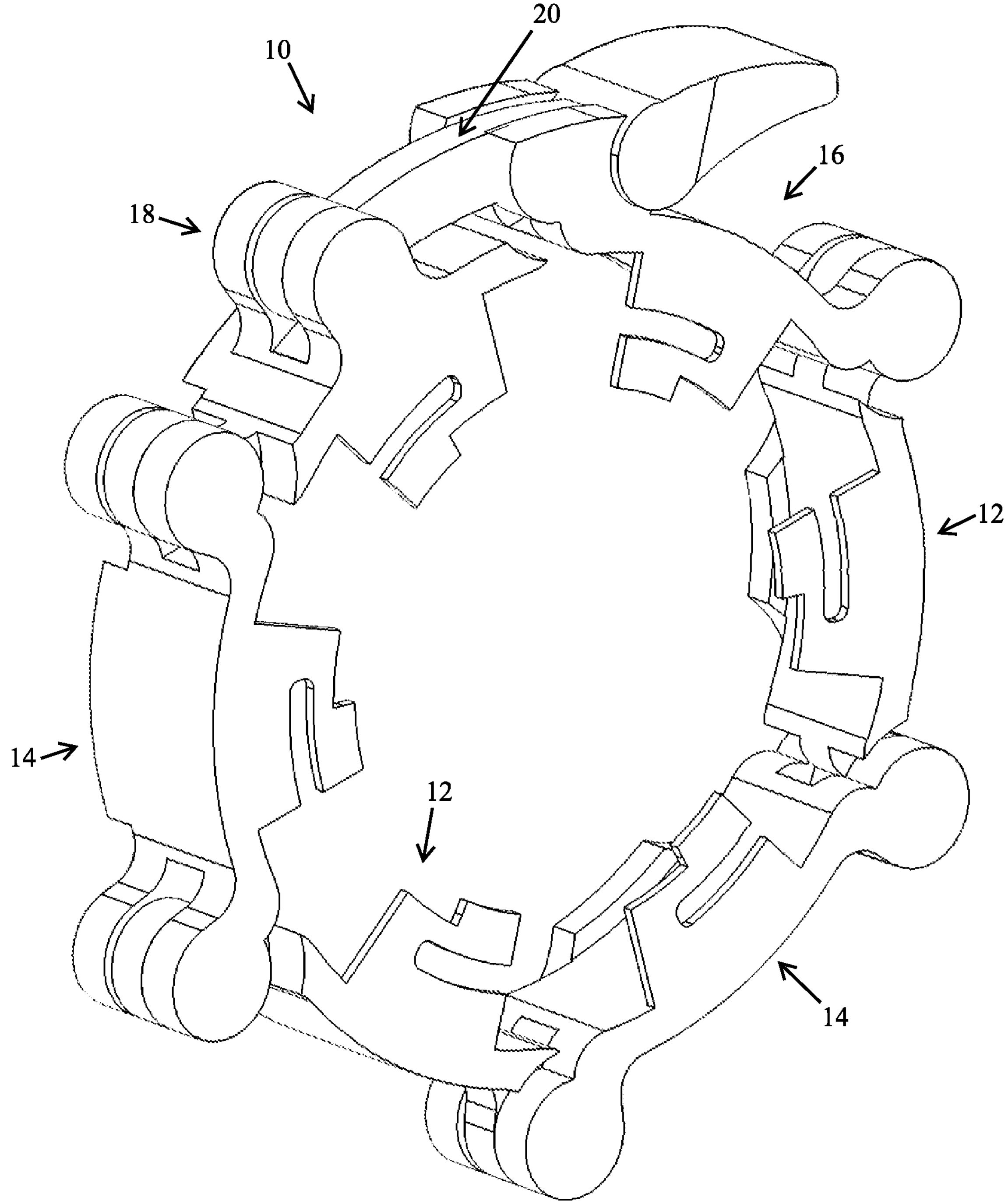
FIGS. 4 and 5 are perspective views of the tool of FIG. 1 as oriented when installed to position a flat ring.
Figure 5:
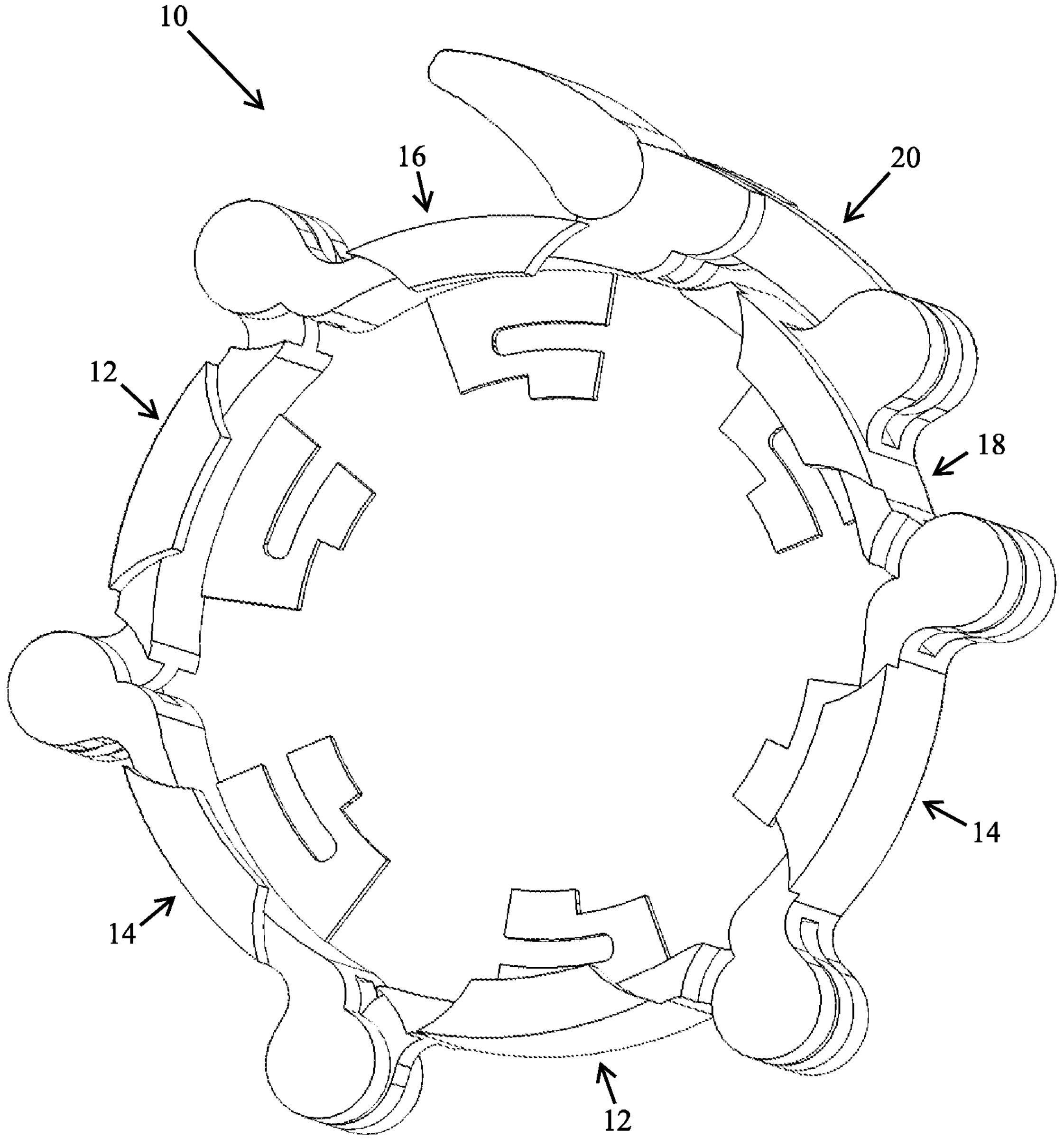
Figure 6:
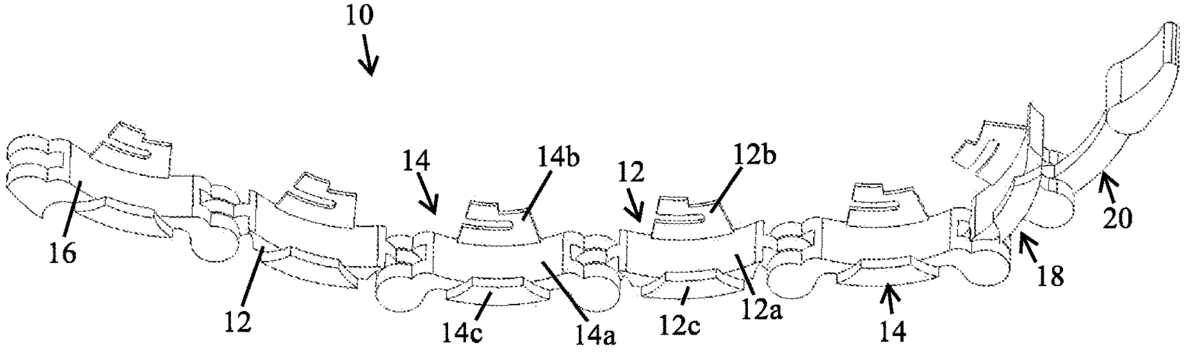
FIGS. 6 and 7 are perspective views of the tool of FIG. 1 in an uninstalled state.
Figure 7:
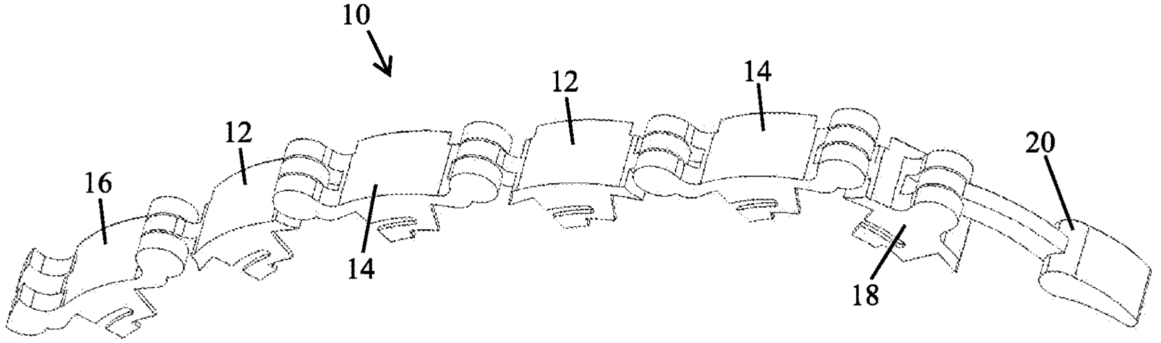
Figure 8:
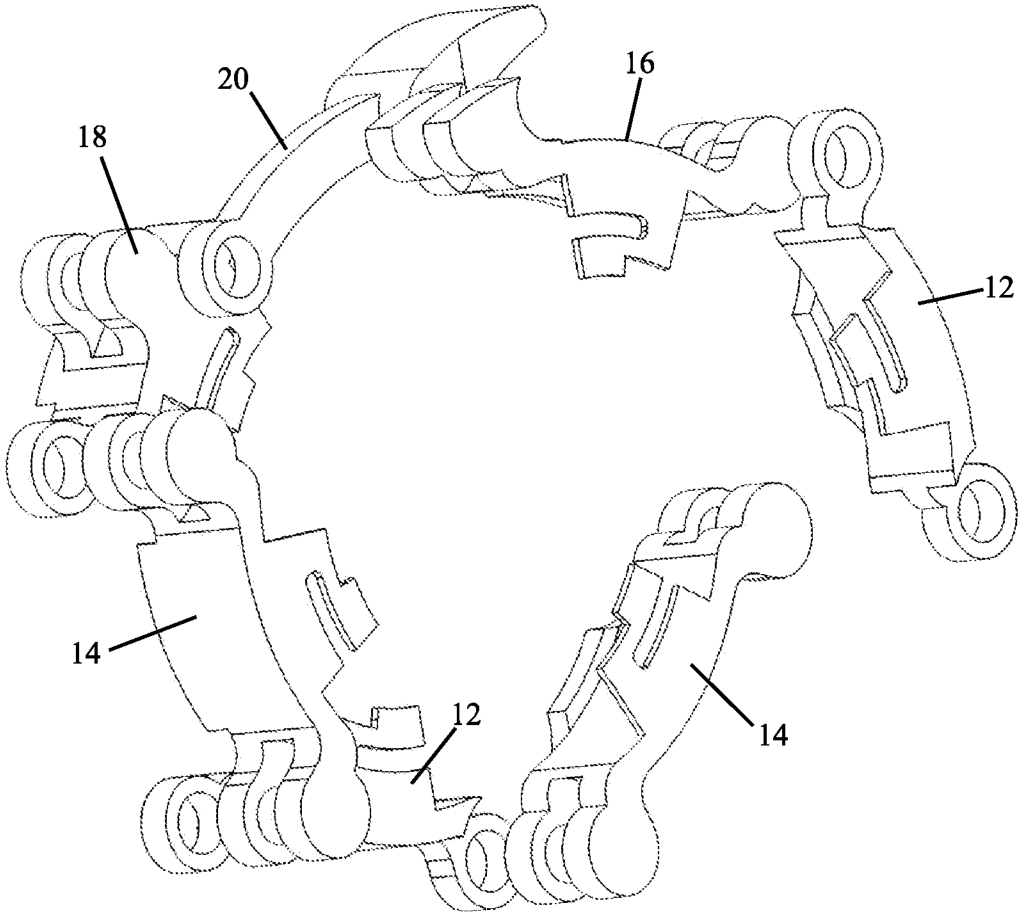
FIGS. 8 and 9 are exploded perspective views of the tool of FIG. 1. As referenced in the Description the tool as shown is made assembled by 3-D printing.
Figure 9:
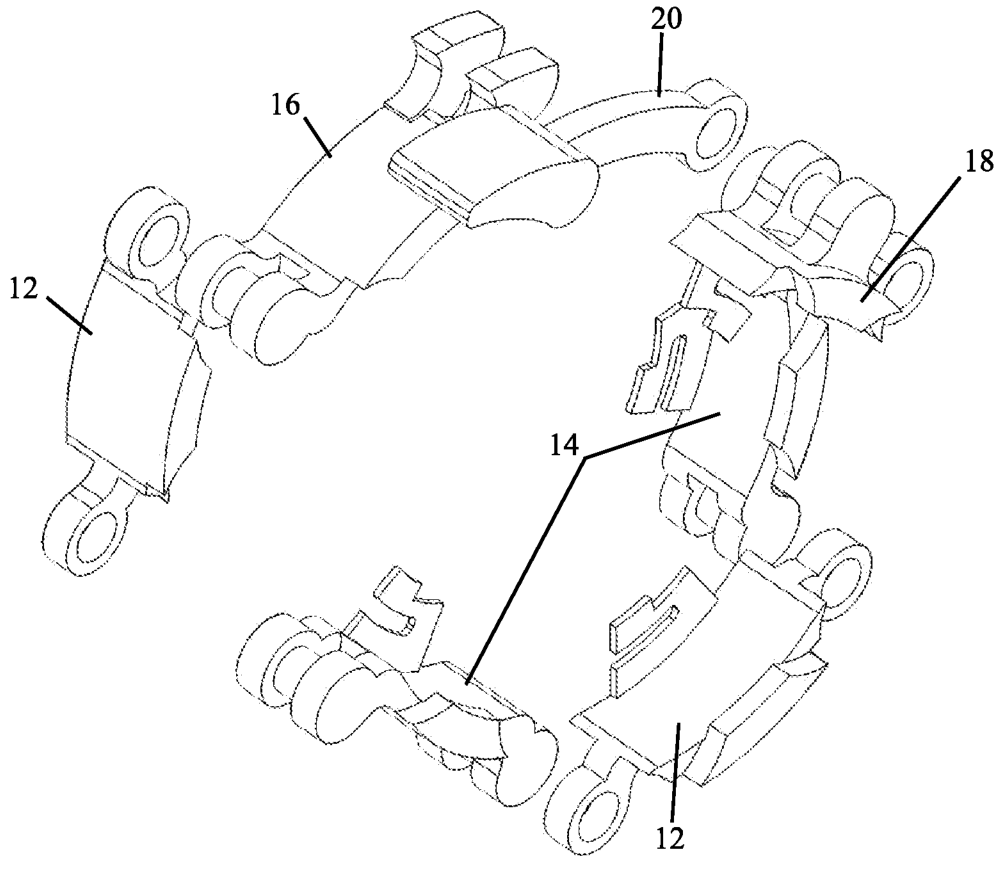

With initial reference to FIGS. 1-19, there is shown a tool 10 for positioning a flat ring such as a gasket G, relative to a cylindrical body, such as the ends of piping or tubing T having a flange F. The described use relates to a preferred use of the tool 10. It will be appreciated that the tool 10 may have other uses, such as for holding and positioning objects, such as locating workpieces together during welding or the like.

In a preferred embodiment, the tool 10 is configured to overlie the curved outer surface of the flange F and to hold the gasket G in a desired position at a joint defined between abutting flanges located at the ends of tubing T as the tubing ends are joined together, with the gasket G sealing the joint between the ends of the tubing T. The flanges may be CF type flanges having knife edges that bite into the gasket G.

With particular reference to FIGS. 1-9, the tool 10 includes a plurality of body segments, such as male body segments 12 and female body segments 14 hingedly connected to one another in an end to end relationship. One end of the tool 10 includes a lock body segment 16 and the opposite end of the tool 10 includes a lock body segment 18 having a lock lever 20 hingedly mounted thereon. The lock lever 20 is positionable in engagement with the lock body segment 16 and pivotal to lockably engage the lock lever 20 when installing the tool 10 on the flange F of the tubing T, as described in more detail below.

Figure 10:
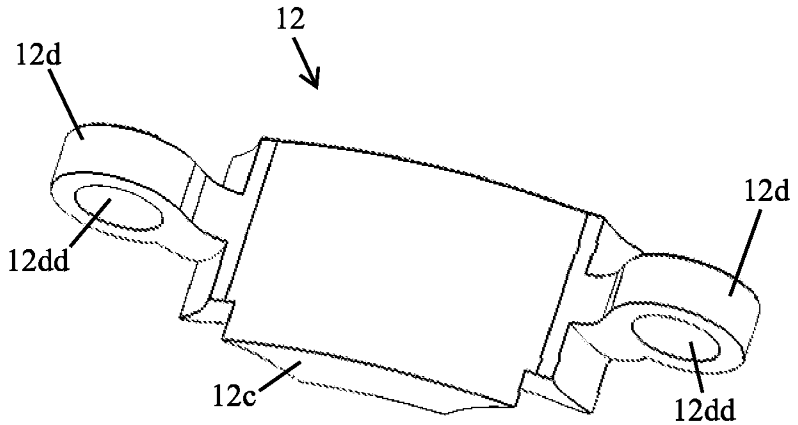
FIGS. 10 and 11 are perspective views of a male body component of the tool of FIG. 1.
Figure 11:
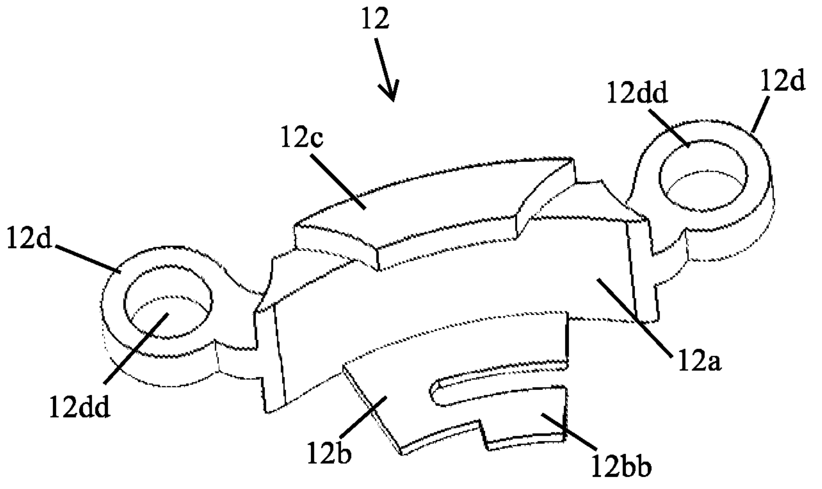

With additional reference to FIGS. 10-11, the male body segments 12 each include an inner concave surface 12*a*, a gasket finger 12*b*, a flange finger 12*c*, and mounts 12*d*. The concave surface 12*a* is configured to conform to the curved outer surface of the flange F. The gasket finger 12*b* is located adjacent a first side of the inner concave surface 12*a* and extending perpendicular to and away from the inner concave surface 12*a*. The gasket finger 12*b* is configured to flex so as to yieldably yet firmly engage the gasket G so that when the tool 10 is installed, the pressure applied to the gasket G is uniform about the circumference of the gasket G. This avoids application of more force in one direction than another so as to not dislocate or uncenter the position of the gasket G and to preserve the location of the gasket G at the joint. The gasket finger 12*b* is thinner than the distance between the two abutting flanges when both knife edges of the flanges F are touching the gasket G.

In a preferred embodiment, the gasket finger 12*b* thus includes an offset gasket contact surface 12*bb* that is able to flex under application of relatively light pressure. In one manner, this is achieved by having the gasket contact surface 12*bb* located at the end of a thin extension spaced from the main body of the finger 12*b* by a gap.

The flange finger 12*c* is located adjacent an opposite second side of the inner concave surface 12*a* and extends perpendicular to and away from the inner concave surface 12*a* parallel to and spaced apart from the gasket finger 12*b*. The flange finger 12*c* is located and configured to contact the side of flange F opposite the gasket G when the tool 10 is installed on the flange F.

The mounts 12*d* extend from the opposite ends of the male body segment 12 and are configured to extend into and pivotally engage corresponding mounts 14*d* of the female body segments 14. The mounts 12*d* are configured as rounded projections with a central aperture 12*dd* configured to hingedly receive a pin 14*dd* of the mount 14*d*.

Figure 12:
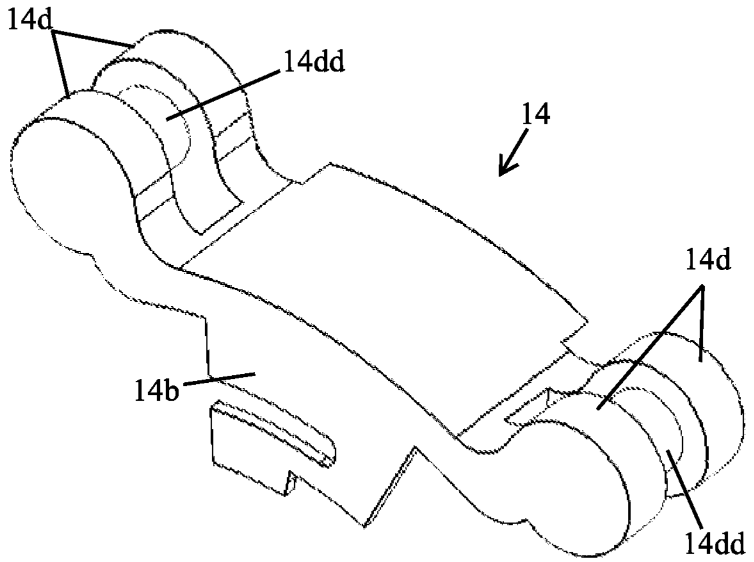
FIGS. 12 and 13 are perspective views of a female body component of the tool of FIG. 1.
Figure 13:
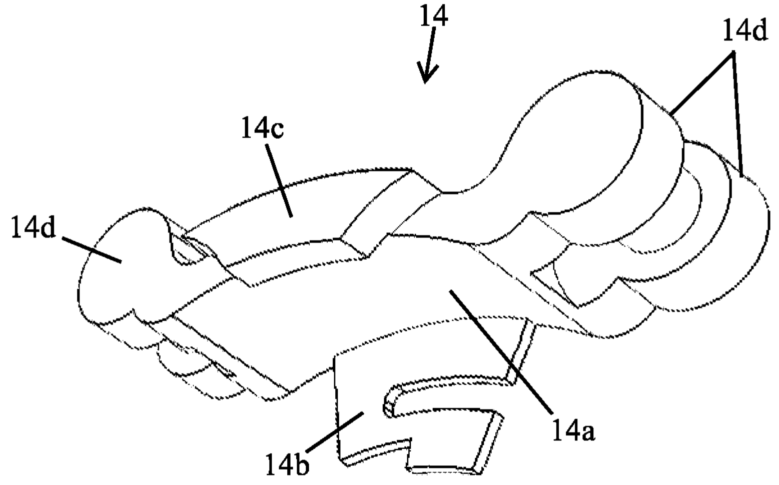

With additional reference to FIGS. 12-13, the female body segments 14 each include an inner concave surface 14*a*, a gasket finger 14*b*, a flange finger 14*c*, and the previously mentioned mounts 14*d* having pins 14*dd*.

The concave surface 14*a* is configured to conform to the curved outer surface of the flange F. The gasket finger 14*b* is located adjacent a first side of the inner concave surface 14*a* and extends perpendicular to and away from the inner concave surface 14*a*. The gasket finger 14*b* is configured to flex so as to yieldably yet firmly engage the gasket G so that when the tool 10 is installed, the pressure applied to the gasket G is uniform about the circumference of the gasket G. This avoids application of more force in one direction than another so as to not dislocate or uncenter the position of the gasket G and to preserve the location of the gasket G at the joint.

In a preferred embodiment, the gasket finger 14*b* is similar to the gasket finger 12*b* and includes an offset gasket contact surface 14*bb* that is able to flex under application of relatively light pressure. In one manner, this is achieved by having the gasket contact surface 14*bb* located at the end of a thin extension spaced from the main body of the finger 14*b* by a gap.

The flange finger 14*c* is located adjacent an opposite second side of the inner concave surface 14*a* and extends perpendicular to and away from the inner concave surface 14*a* parallel to and spaced apart from the gasket finger 14*b*. The flange finger 14*c* is located and configured to contact the side of flange F opposite the gasket G when the tool 10 is installed on the flange F.

The mounts 14*d* extend from the opposite ends of the female body segment 14 and are configured to matingly receive and pivotally engage the corresponding mounts 12*d* of the male body segments 14. The mounts 14*d* are configured as spaced apart legs that receive the mounts 12*d*, with the pin 14*dd* received by the aperture 12*dd* of the mount 12*d*.

With additional reference to FIGS. 14-17, the lock body segment 16 includes an inner concave surface 16*a*, a gasket finger 16*b*, a flange finger 16*c*, mount 16*d*, and a lock surface 16*e*.

The concave surface 16*a* is configured in the manner of the surfaces 12*a* and 14*a* and is configured to conform to the curved outer surface of the flange F. The gasket finger 16*b* is located adjacent a first side of the inner concave surface 16*a* and extends perpendicular to and away from the inner concave surface 16*a*. The gasket finger 16*b* is configured in the manner of the gasket fingers 12*b* and 14*b* to flex so as to yieldably engage the gasket G so that when the tool 10 is installed, the pressure applied to the gasket G is uniform about the circumference of the gasket G.

The flange finger 16*c* is located adjacent an opposite second side of the inner concave surface 16*a* and extends perpendicular to and away from the inner concave surface 16*a* parallel to and spaced apart from the gasket finger 16*b*. The flange finger 16*c* is located and configured to contact the side of flange F opposite the gasket G when the tool 10 is installed on the flange F.

The mount 16*d* extends from an end of the lock body segment 16 and is configured in the manner of the mounts 14*d* to matingly receive and pivotally engage one of the mounts 12*d* of an adjacent one of the male body segments 14. The mount 16*d* is configured as spaced apart legs that receive the mount 12*d*, with a pin 16*dd* received by the aperture 12*dd* of the mount 12*d*.

The lock surface 16*e* is configured to lockingly engage both the lock body segment 18 and the lock lever 20. The lock surface 16*e* includes spaced apart stops 16*ee* configured to matingly engage the lock body segment 18 and spaced apart lever receivers 16*eee* configured to matingly engage the lever 20.

With additional reference to FIGS. 14-15 and 18-19, the lock body segment 18 includes an inner concave surface 18*a*, a gasket finger 18*b*, a flange finger 18*c*, mount 18*d*, a lock surface 18*e*, and a lever mount 18*f*.

The concave surface 18*a* is configured in the manner of the surfaces 12*a*, 14*a*, and 16*a* and is configured to conform to the curved outer surface of the flange F. The gasket finger

18*b* is located adjacent a first side of the inner concave surface 18*a* and extends perpendicular to and away from the inner concave surface 18*a*. The gasket finger 18*b* is configured in the manner of the gasket fingers 12*b*, 14*b*, and 16*b* to flex so as to yieldably engage the gasket G so that when the tool 10 is installed, the pressure applied to the gasket G is uniform about the circumference of the gasket G.

The flange finger 18*c* is located adjacent an opposite second side of the inner concave surface 18*a* and extends perpendicular to and away from the inner concave surface 18*a* parallel to and spaced apart from the gasket finger 18*b*. The flange finger 18*c* is located and configured to contact the side of flange F opposite the gasket G when the tool 10 is installed on the flange F.

The mounts 18*d* extends from an end of the lock body segment 18 and is configured in the manner of the mounts 12*d* to extend into and pivotally engage one of the mounts 14*d* of an adjacent female body segment 14. The mount 18*d* is configured as rounded projections with a central aperture 18*dd* configured to hingedly receive the pin 14*dd* of the mount 14*d*.

Figure 14:
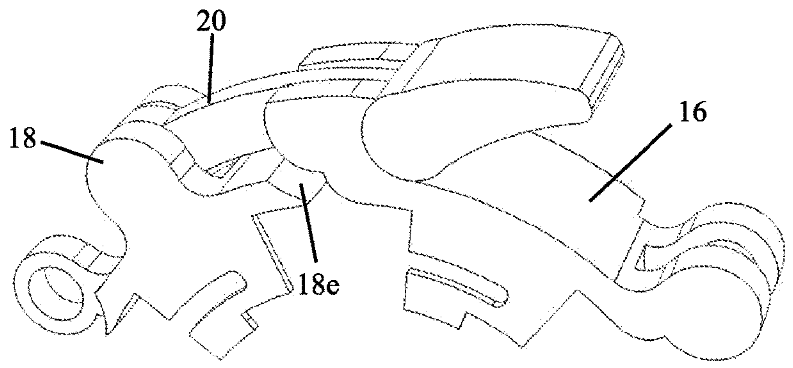
FIG. 14 shows components of structure for locking the tool of FIG. 1 in an installed state.

The lock surface 18*e* is concave and shaped to matingly engage the stops 16*ee*, which are convex. As seen in FIG. 14, when the lever 20 is engaged with the lever receivers 16*eee*, which corresponds to a locked position of the lever 20, the lock surface 18*e* is matingly engaged with the stops 16*ee*.

The lever mount 18*f* is configured as spaced apart legs having a pin 18*ff* received by an aperture 20*aa* of the lever 20.

Figure 15:
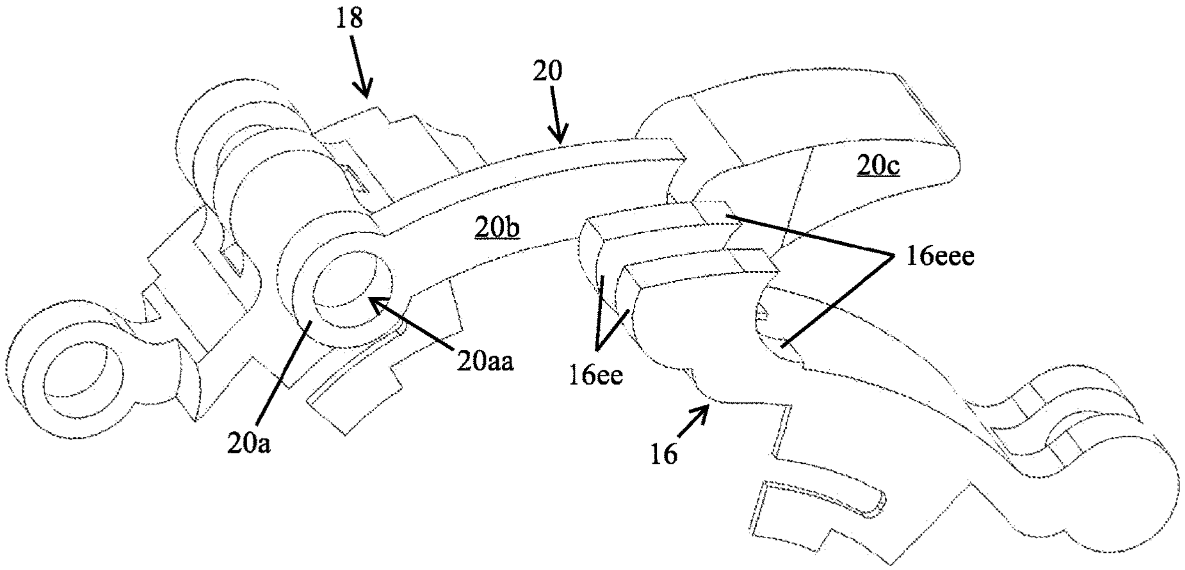
FIG. 15 is an exploded view of the lock structure of FIG. 14.
Figure 16:
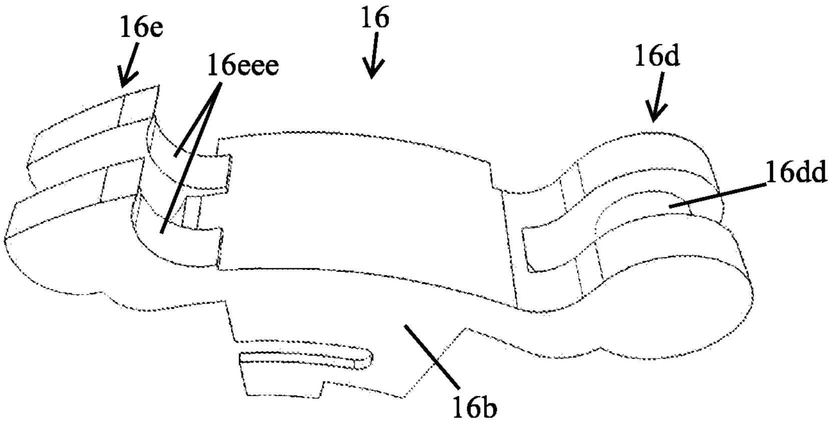
FIGS. 16 and 17 show a body component of the lock structure of FIG. 14 that has a lock surface for engaging a lock lever of the lock structure.
Figure 17:
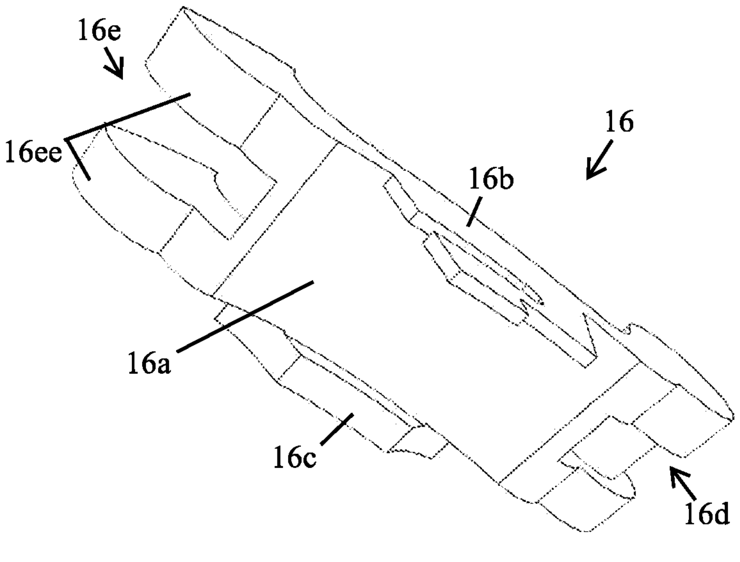
Figure 18:
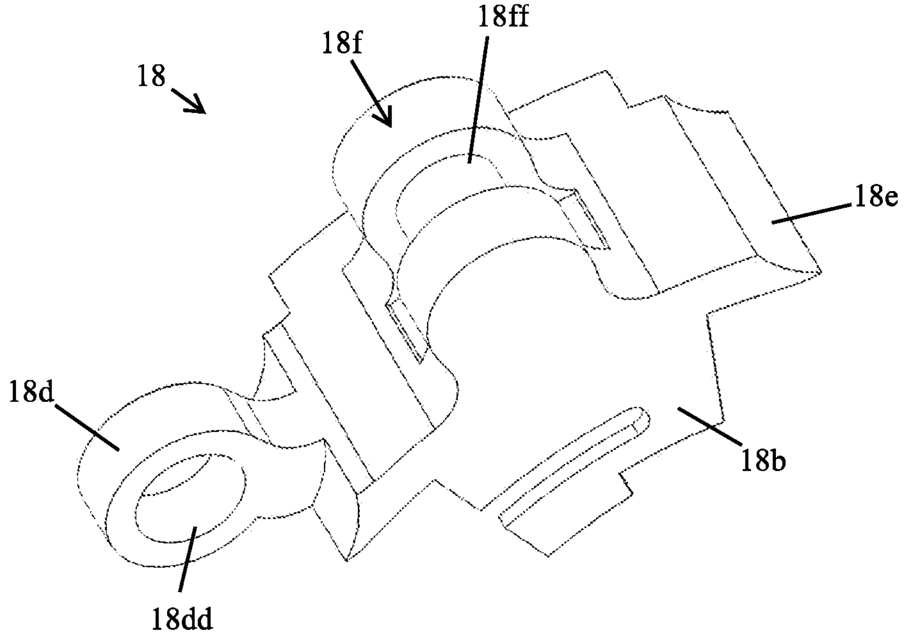
FIGS. 18 and 19 show a body component of the lock structure of FIG. 14 configured for having a lock lever hingedly mounted thereon.
Figure 19:
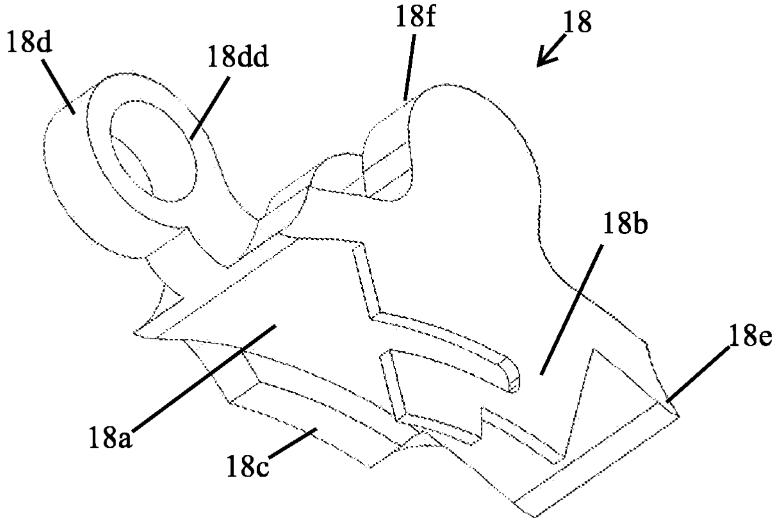
Figure 20:
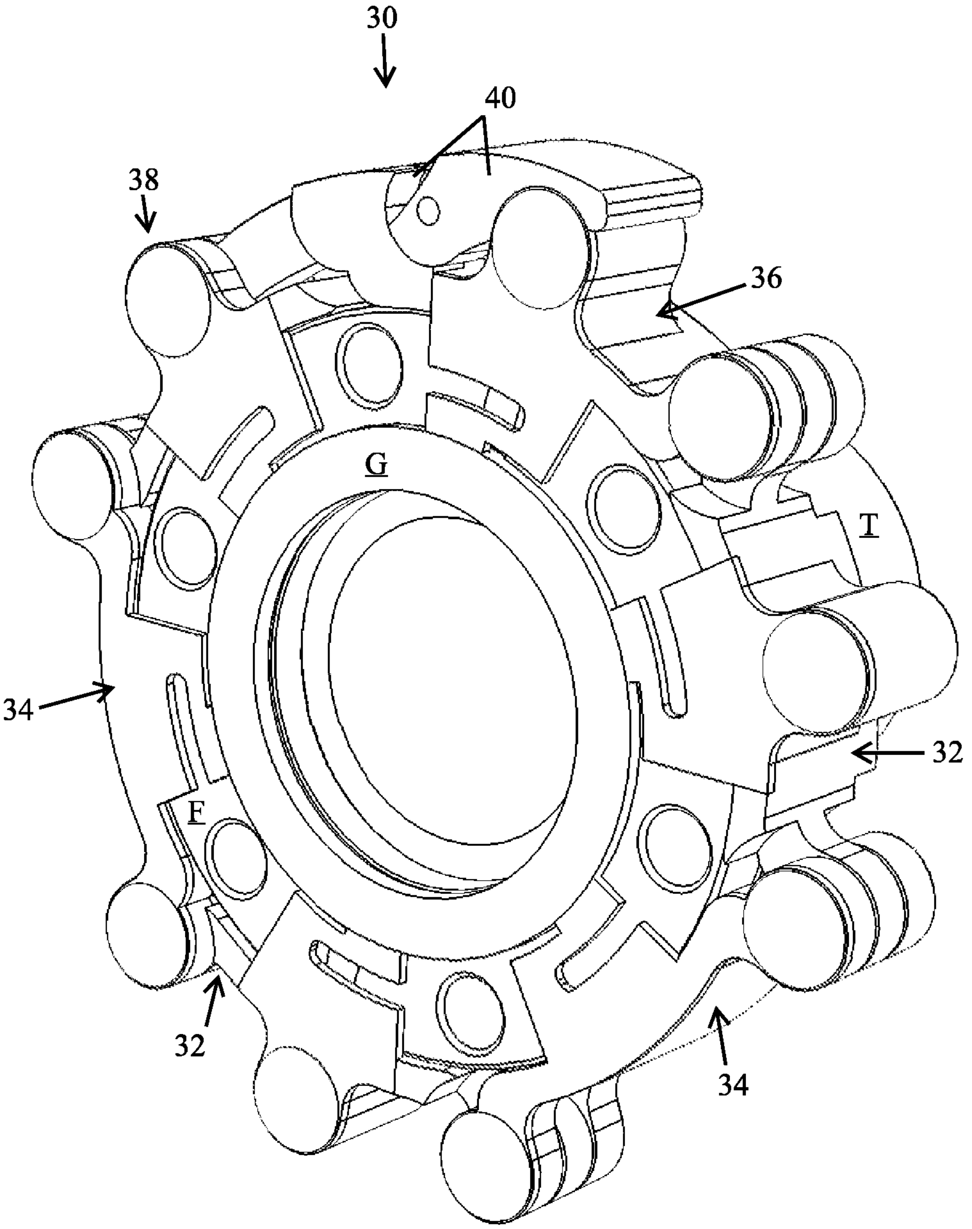
FIGS. 20 and 21 show an alternate embodiment of a tool in use for positioning a flat ring at the end of a cylindrical body.
Figure 21:
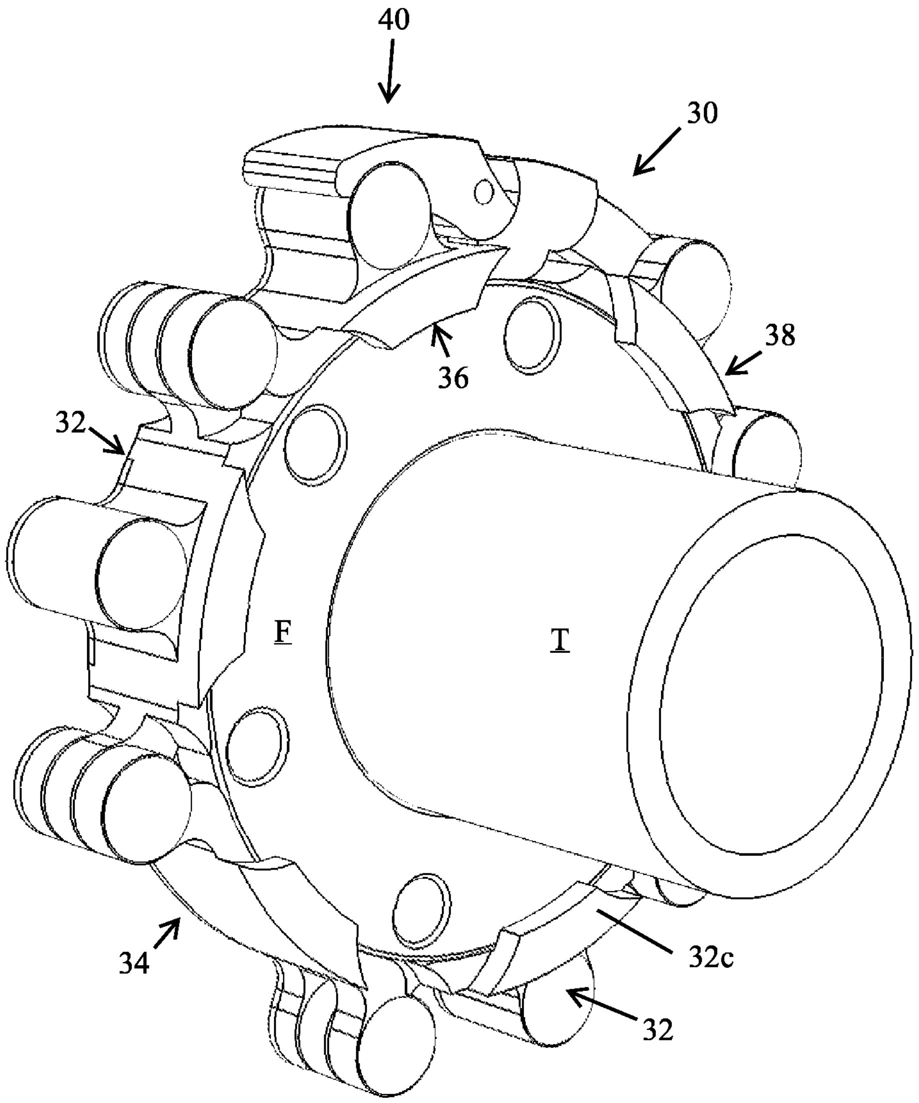
Figure 22:
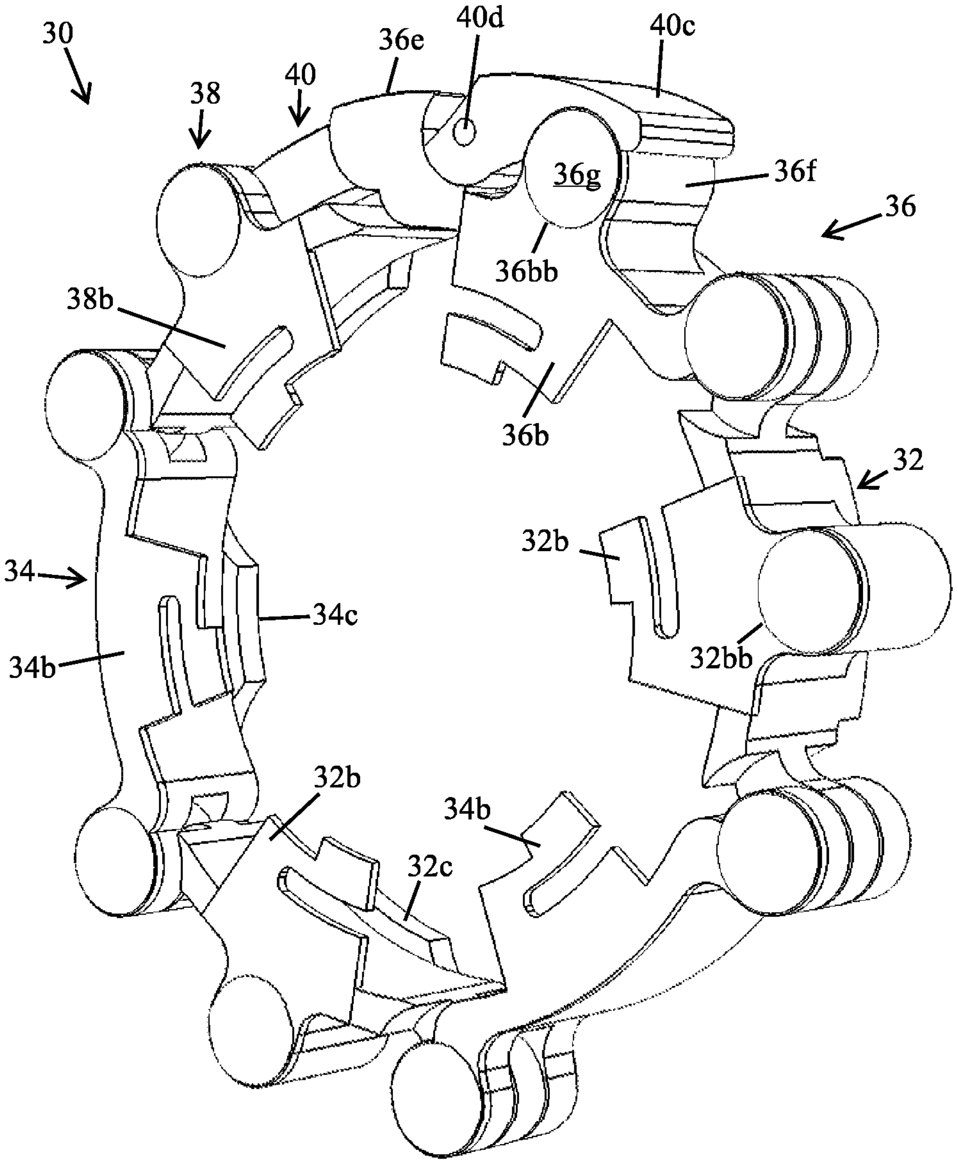
FIGS. 22 and 23 are perspective views of the tool of FIGS. 20 and 21 as oriented when installed to position a flat ring.
Figure 23:
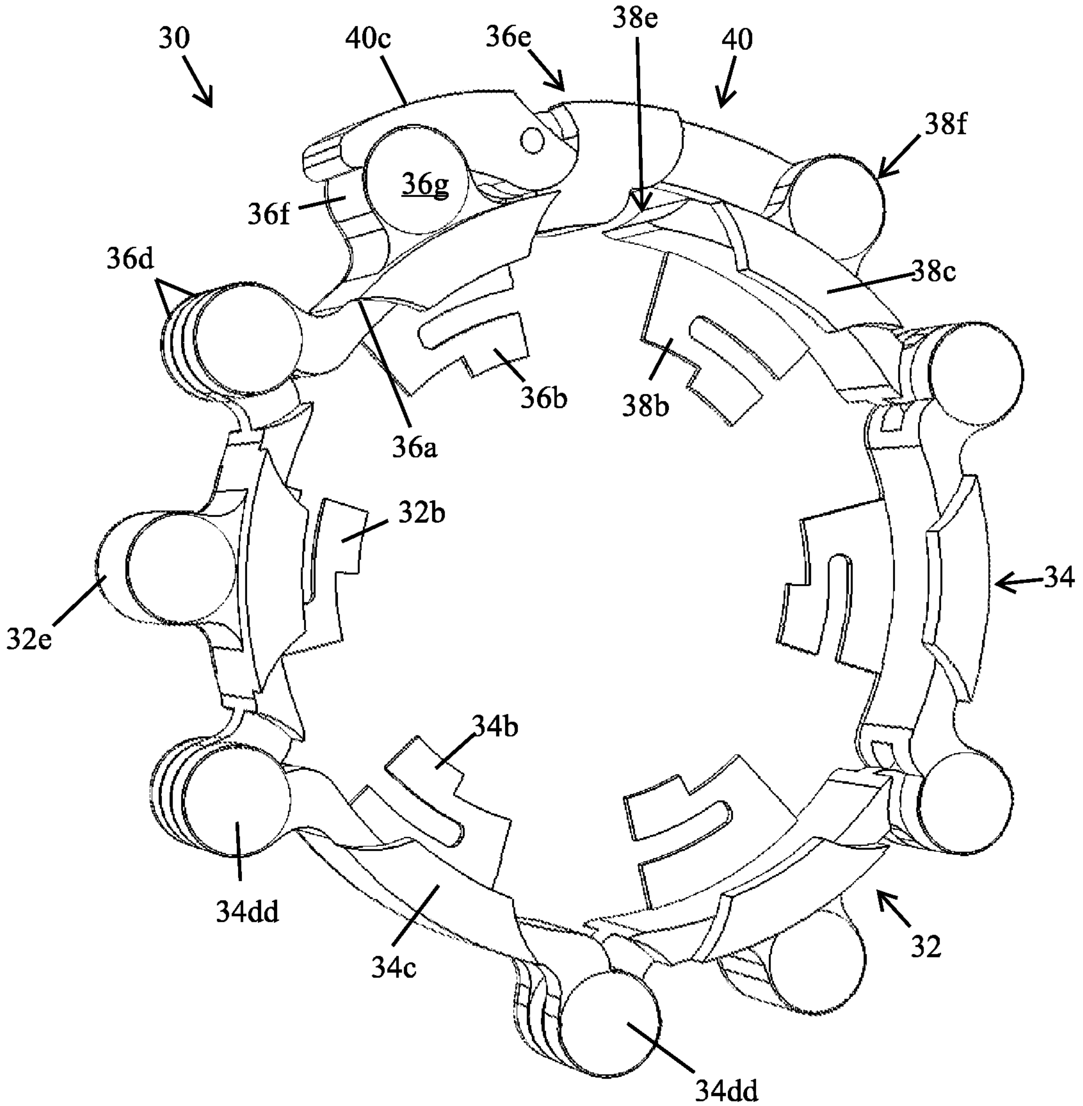
Figure 24:
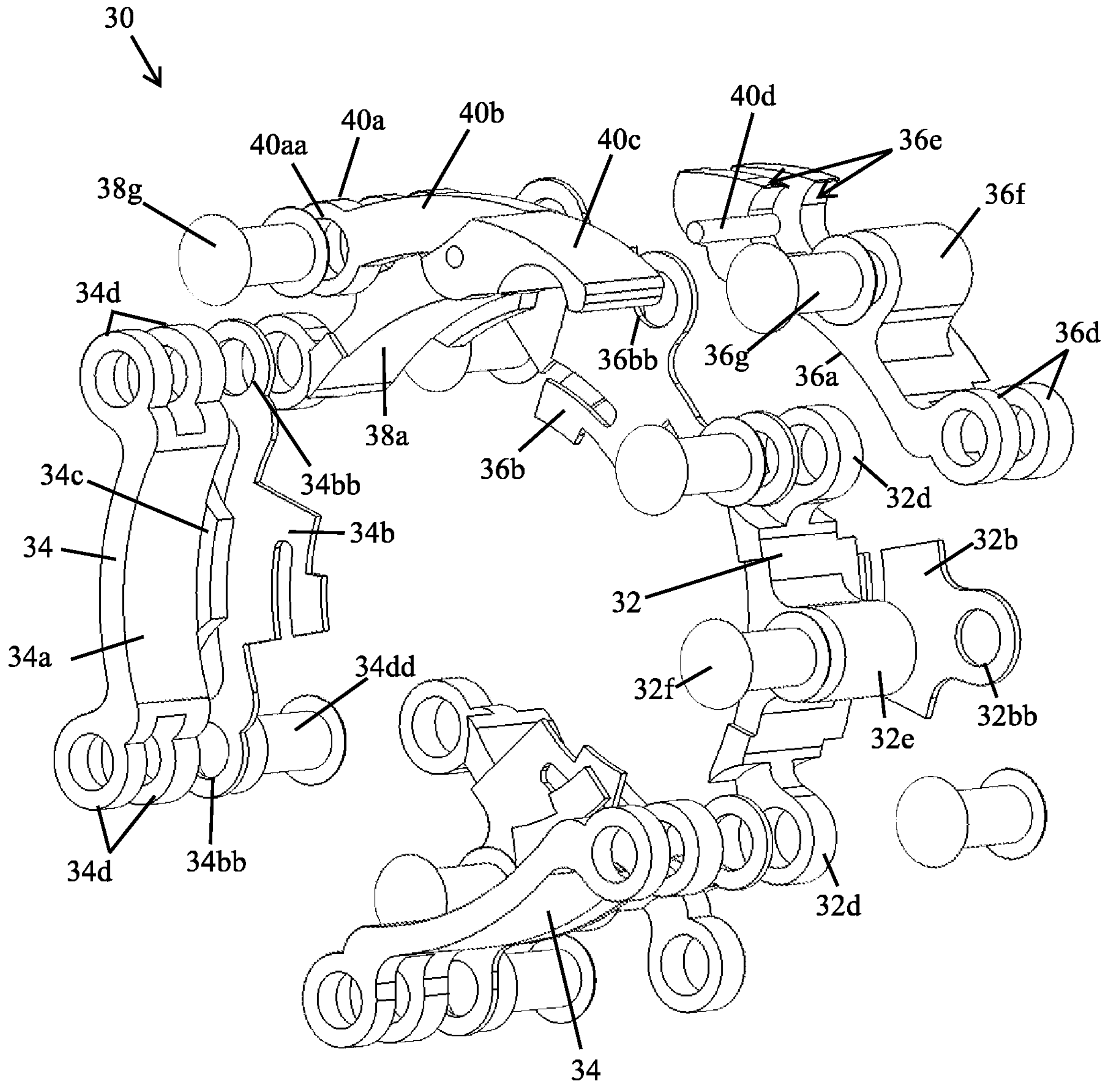
FIGS. 24 and 25 are exploded perspective views of the tool of the tool of FIGS. 20 and 21.
Figure 25:
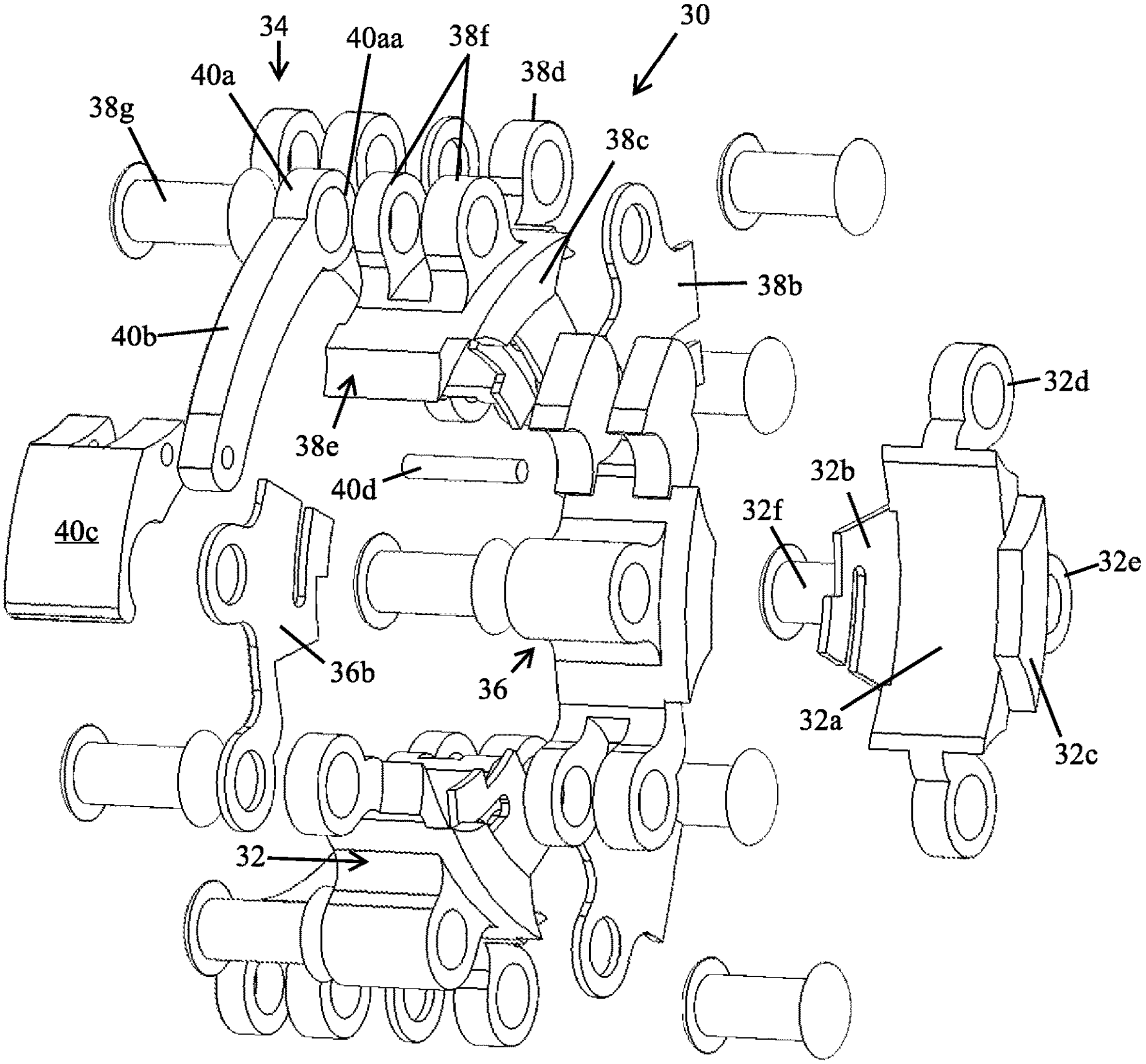
Figure 26:
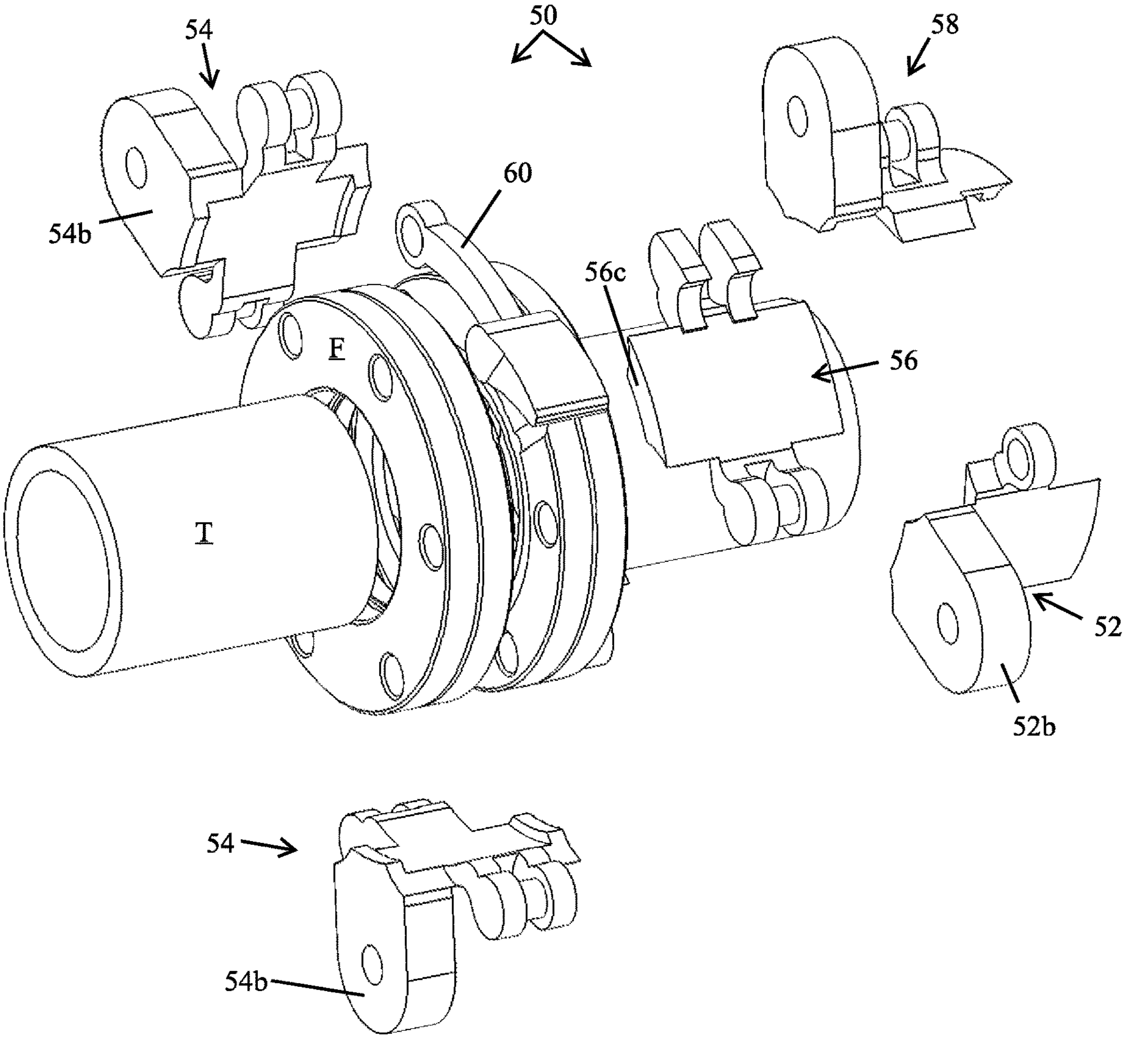
FIG. 26 is an exploded perspective view a flexible implement positioner according to another aspect of the invention and configured for locating implements such as gauges and the like on a cylindrical body such as tubing having CF flanges.
Figure 27:
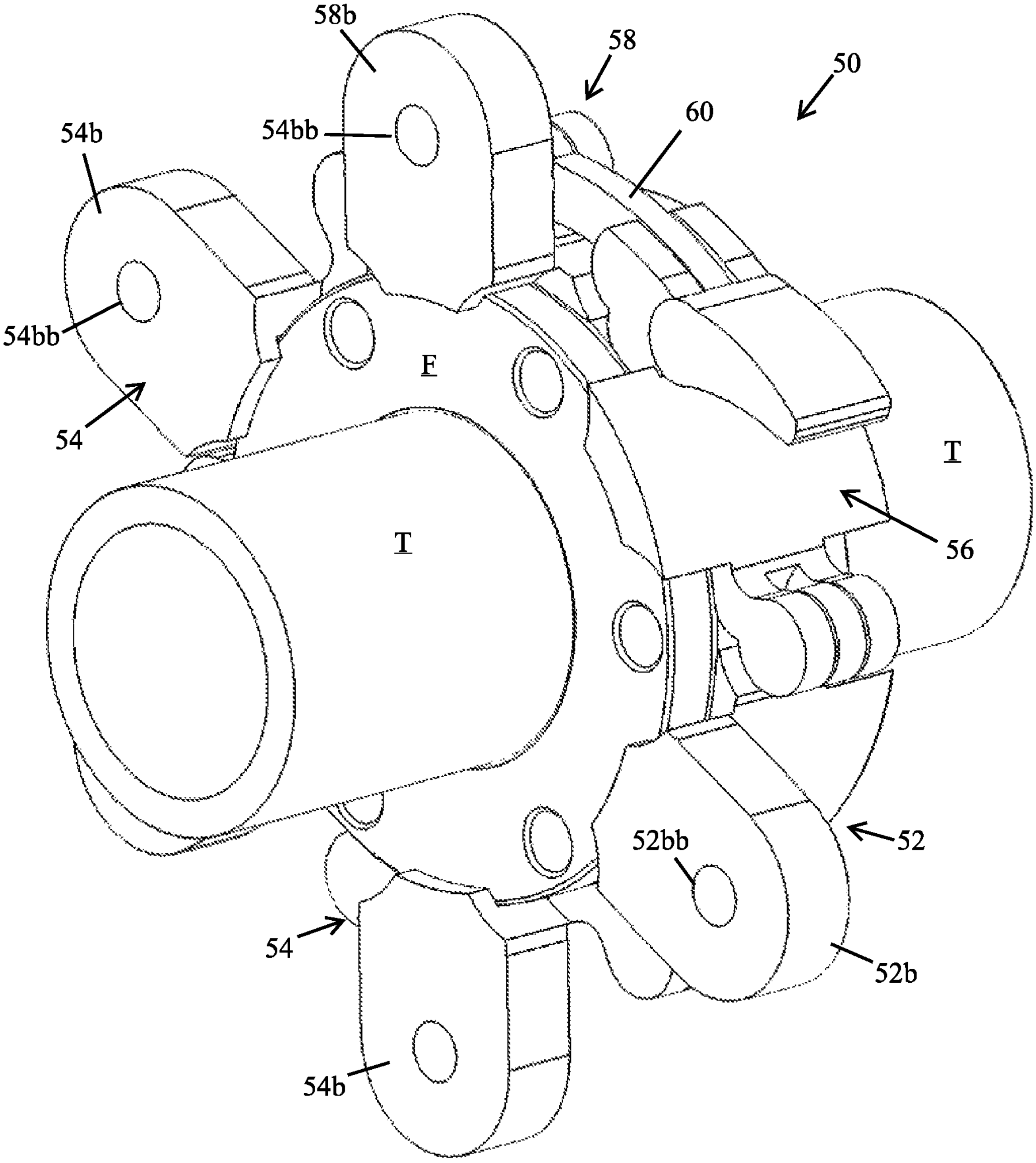
FIGS. 27 and 28 show the flexible implement positioner of FIG. 26 installed on the CF flanges.

With additional reference to FIGS. 14 and 15, the lever 20 is elongate and includes a foot 20*a*, a trunk 20*b*, and a head 20*c*. The foot 20*a* includes the aperture 20*aa* that receives the pin 18*ff* of the lever mount 18*f* to pivotally mount the lever 20 to the lock body segment 18. The trunk 20*b* is narrow to fit between the space between the lever receivers 16*eee* and sufficiently elongate to connectedly span between the lock body segments 16 and 18. The head 20*c* is configured to matingly and lockingly engage the lever receivers 16*eee* of the lock surface 16*e*.

In use of the tool 10 to install the gasket G, the tool 10 is installed around the flange F is positionable so that the lock body segments 16 and 18 are locked together with the lock lever 20 lockably engaged with the lock surface 16*e* and the body segments 12 and 14 are located to surround the flange F, with the gasket fingers 12*b*, 14*b*, 16*b*, and 18*b* bearing against the gasket G and the flange fingers 12*c*, 14*c*, 16*c*, and 18*c* bearing against the flange F so that the gasket G is maintained in position by the tool for installation of the gasket G.

The tool 10 is desirably made in an assembled state as by three-dimensional printing techniques. For example, the components may made of plastic, such as thermoplastics, such as such as acrylonitrile butadiene styrene (ABS) and other polymers suitable for three-dimensional printing. The tool 10 is made in an assembled state with the body segments connected together by printing the tool 10 with a three-dimensional printer utilizing one print head for plastic and another print head for a support material. After printing of the assembled tool 10, the assembled tool is exposed to a solution to dissolve the support material. The support material and solution to dissolve the support material may be conventional support materials and solutions used in three-dimensional printing. However, it will be understood that the tool 10 may be made by other molding or manufacture techniques using a variety of materials.

For example, in one example the tool 10 may be made having separately produced components, and then assembled. In this regard, and with reference now to FIGS. 20-25, there is shown an alternate embodiment of a tool 30 for positioning a flat ring such as gasket G, relative to a cylindrical body, such as the ends of piping or tubing T having flange F. The components of the tool 30 are desirably separately formed, preferably of metal, and then assembled. The overall structure of the tool 30 is substantially similar as the tool 10, except that portions of the body segments, such as the gasket fingers, connection pins and the like are separately formed and are joined to the body segments. Also, the body segments must be connected to one another, as by insertion of pins or fasteners, and the tool is not formed fully assembled in the manner of the tool 10 as manufactured by three-dimensional printing.

The tool 30 includes a plurality of body segments, such as male body segments 32 and female body segments 34 hingedly connected to one another in an end to end relationship. One end of the tool 30 includes a lock body segment 36 and the opposite end of the tool 30 includes a lock body segment 38 having a lock lever 40 hingedly mounted thereon. The lock lever 40 positionable in engagement with the lock body segment 36 and pivotal to lockably engage the lock lever 40 when installing the tool 30 on the flange F of the tubing T.

The male body segments 32 substantially conform to the male body segments 12, but are not of unitary construction and have the components thereof separately formed and assembled together. For example, the male body segments 32 include an inner concave surface 32*a*, a gasket finger 32*b*, a flange finger 32*c*, and mounts 32*d*. The gasket finger 32*b* is a separate piece and may be attached to the body segment 32 in various ways using welds or fasteners. It is preferred to include a gasket finger mount 32*e* on the outer surface of the body segment 32, and attach the finger 32*b* to the finger mount 32*e* as by use of a pin 32*f*. In this regard, the gasket finger 32*b* includes an aperture 32*bb* through which the pin 32*f* is passed. The flange finger 32*c* and mounts 32 are co-formed with the body segments 32.

The female body segments 34 substantially conform to the female body segments 34, but are not of unitary construction and have the components thereof separately formed and assembled together. For example, the female body segments 34 include an inner concave surface 34*a*, a gasket finger 34*b*, a flange finger 34*c*, and mounts 34*d* having pins 34*dd*. The gasket finger 34*b* and the pins 34*dd* are separate components. The gasket finger 34*b* includes apertures 34*bb* through which the pins 34*dd* are passed.

The lock body segment 36 is similar to the lock body segment 16 and includes an inner concave surface 36*a*, a gasket finger 36*b*, a flange finger 36*c*, mount 36*d*, and a lock surface 36*e*. The body segment 36 includes a gasket finger mount 36*f* on the outer surface of the body segment 36. The gasket finger mount 36*f* also serves as a rest for the lock lever 40 when in the locked position. The gasket finger 36*b* includes an aperture 36*bb* though which a pin 36*g* is passed to mount the gasket finger 36*b* to the mount 36*f*.

The lock body segment 38 is similar to the lock body segment 18 and includes an inner concave surface 38*a*, a gasket finger 38*b*, a flange finger 38*c*, mount 38*d*, a lock surface 38*e*, and a lever mount 38*f*. A pin 38*g* is used to pivotally mount the lever 40 to the lever mount 38*f*.

The lock lever 40 is elongate and includes a foot 40*a*, a trunk 40*b*, and a head 40*c*. The head 40*c* is a separate part and is connected to the trunk 40*b* by a pin 40*d*. The foot 40*a* includes aperture 40*aa* through which the pin 38*g* is passed to mount the lever 40 to the lock body segment 38.

The tool 30 is installed onto the flange F and utilized in a manner similar to that described for the tool 10 to hold the gasket G in place during installation of the gasket G.

Another aspect of the invention relates to providing a flexible implement positioner that is lockably installable around the abutting flanges of the abutting tubes to enable an implement, such as a temperature gauge, to be desirably positioned near the joint between the abutting flanges.

With reference now to FIGS. 26-42, there is shown in accordance with another embodiment of the invention a flexible implement positioner 50 securably positionable about a juncture of two abutting ones of the tubes T having abutting flanges F. The implement positioner 50 is configured to mount to the abutting flanges F, to locate an implement between the flanges F for locating the implement to monitor the joint between the flanges F.

The implement positioner 50 may be formed in the manner of the tool 10 by three-dimensional printing. Alternatively, the implement positioner 50 may be formed in the manner of the tool 30, with the components separately made and joined together using pins or other fasteners. As shown, the implement positioner is made using three-dimensional printing in the manner of the tool 10.

The implement positioner includes a plurality of body segments, such as male body segments 52 and female body segments 54 hingedly connected to one another in an end to end relationship. One end of the implement positioner includes a lock body segment 56 and the opposite end of the implement positioner includes a lock body segment 58 having a lock lever 60 hingedly mounted thereon. The lock lever 60 is positionable in engagement with the lock body segment 56 and pivotal to lockably engage the lock lever 60 when installing the implement positioner on one of the flanges F.

Figure 28:
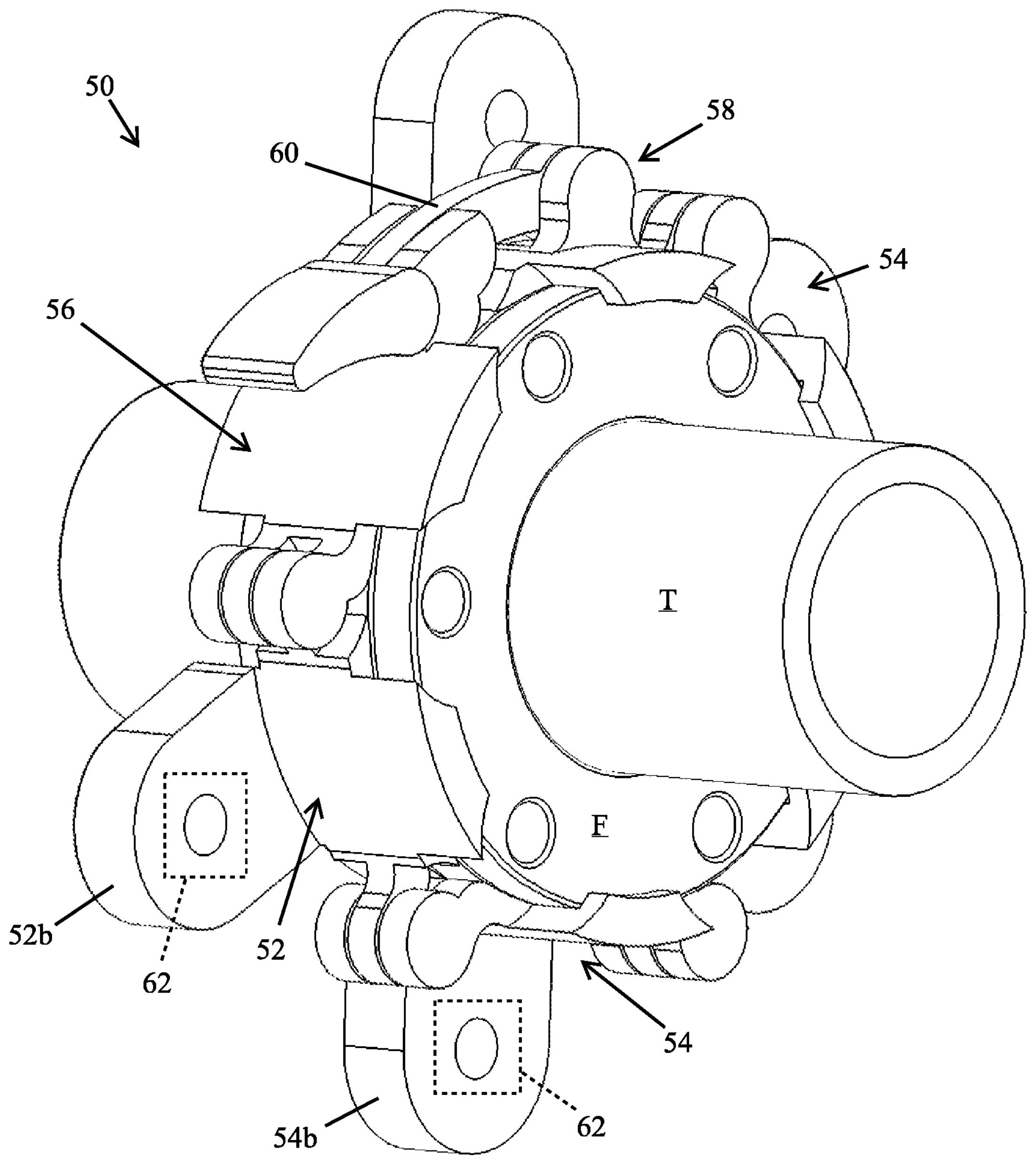
Figure 29:
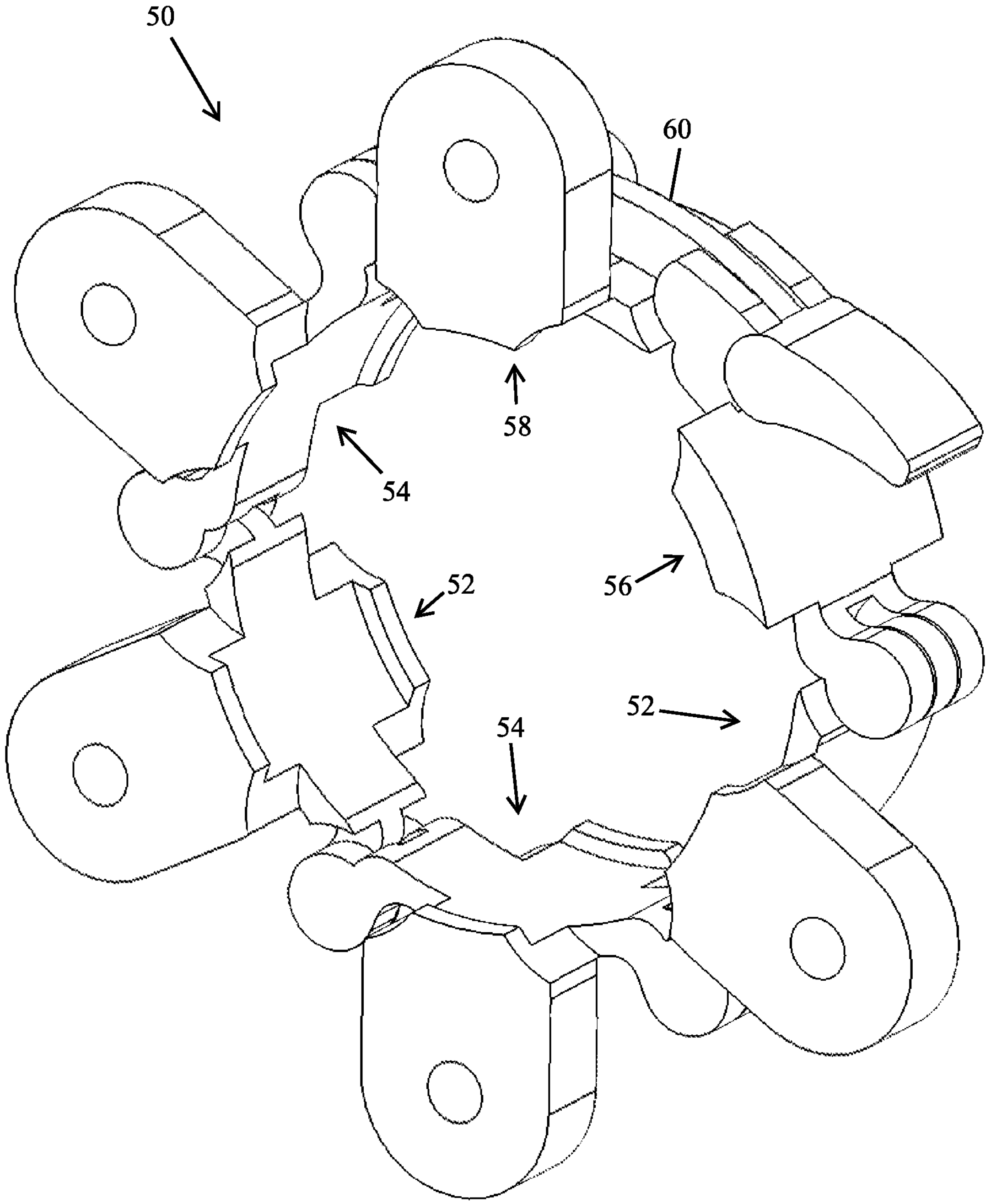
FIGS. 29 and 30 are perspective views of the implement positioner of FIGS. 27 and 28.
Figure 30:
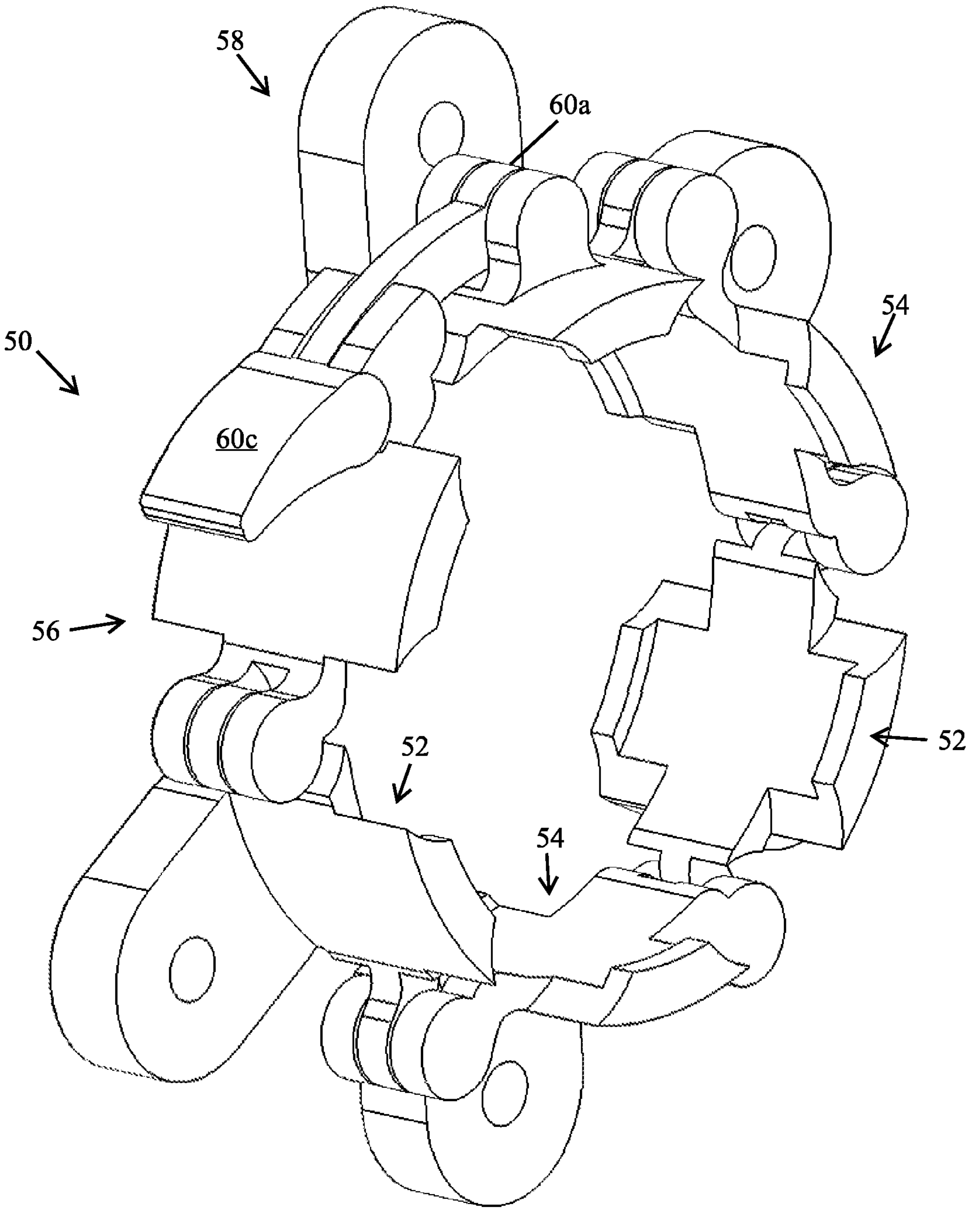
Figure 31:
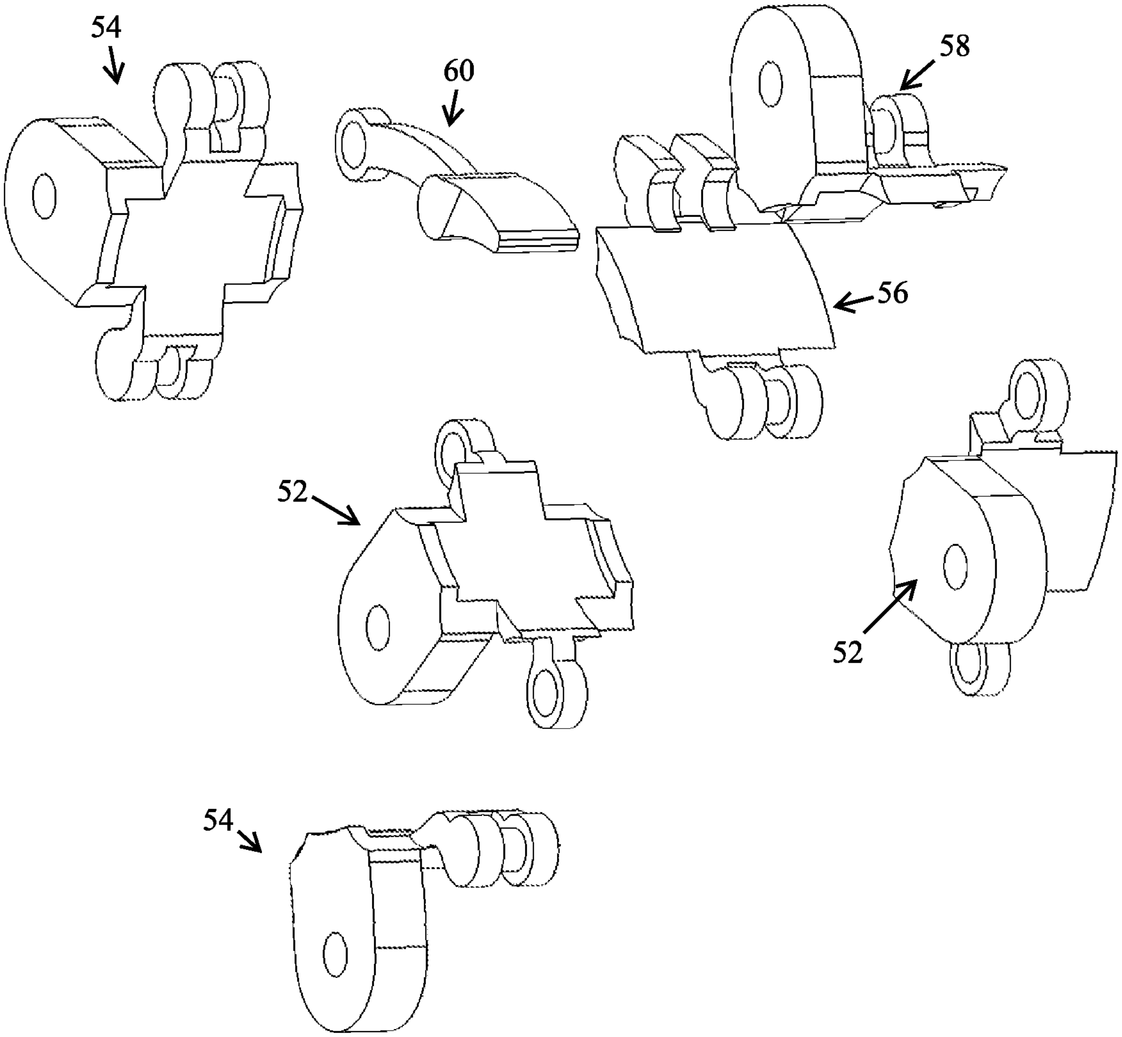
FIG. 31 is a perspective view of the implement positioner of FIGS. 27 and 28.
Figure 32:
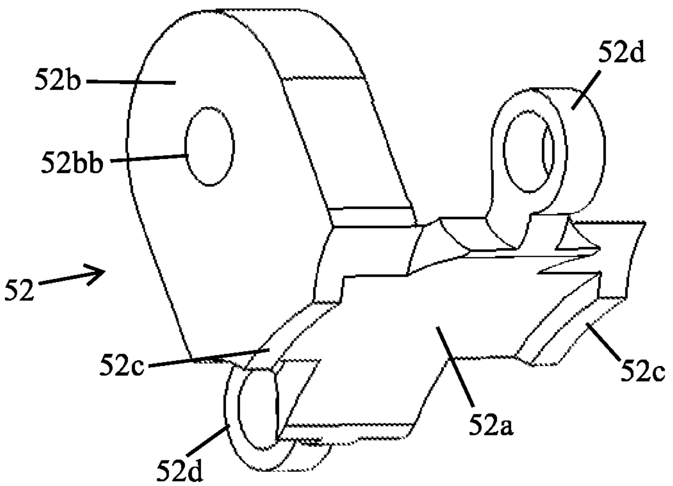
FIGS. 32 and 33 are perspective views of a male body component of the implement positioner of FIGS. 27 and 28.
Figure 33:
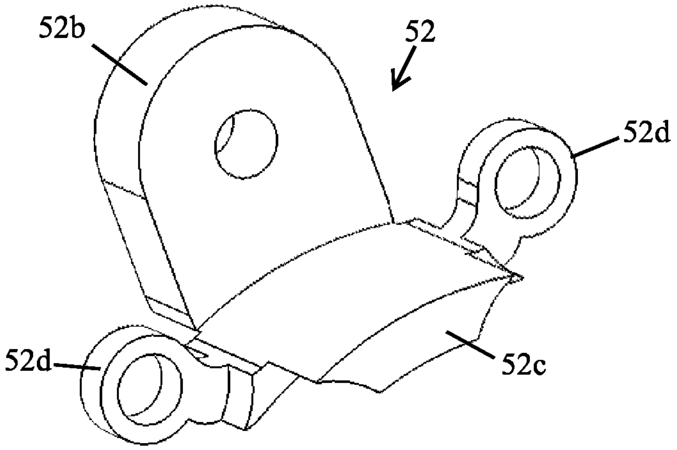
Figure 34:
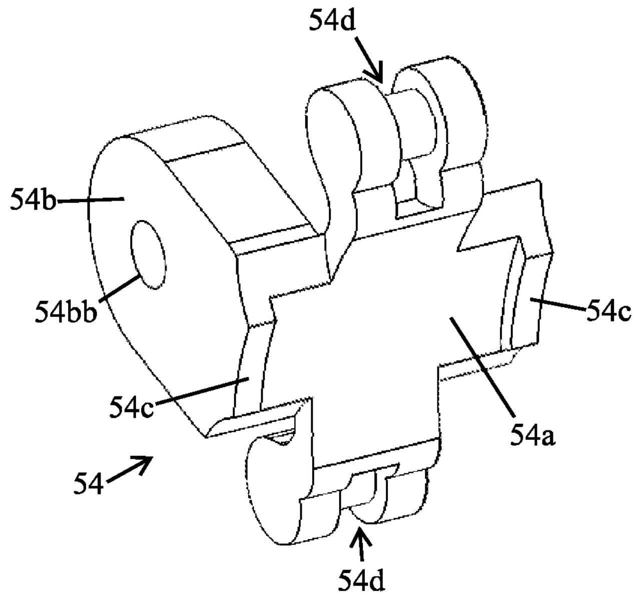
FIGS. 34 and 35 are perspective views of a female body component of the implement positioner of FIGS. 27 and 28.
Figure 35:
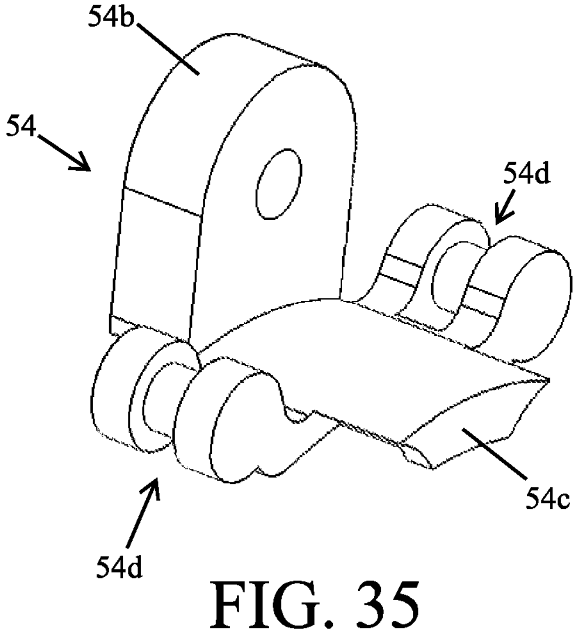
Figure 36:
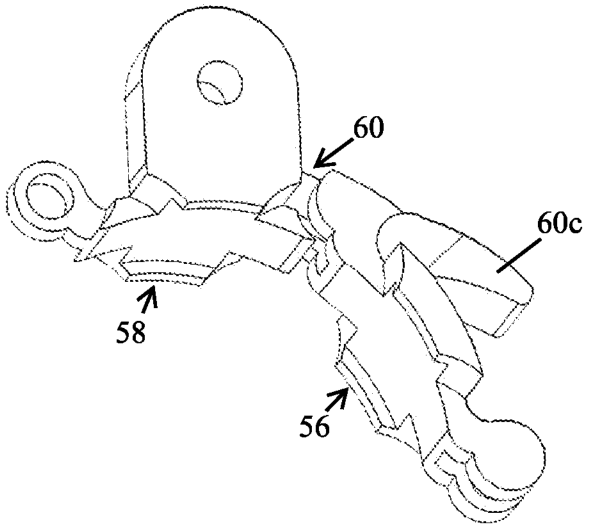
FIGS. 36 and 37 are perspective views of a lock structure of the implement positioner of FIGS. 27 and 28.
Figure 37:
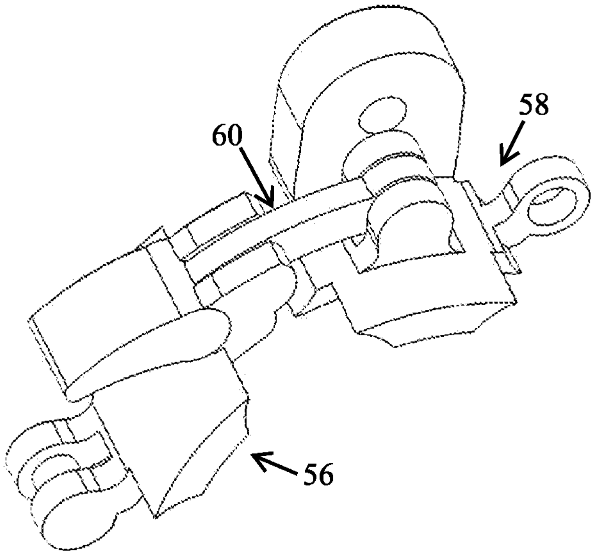
Figure 38:
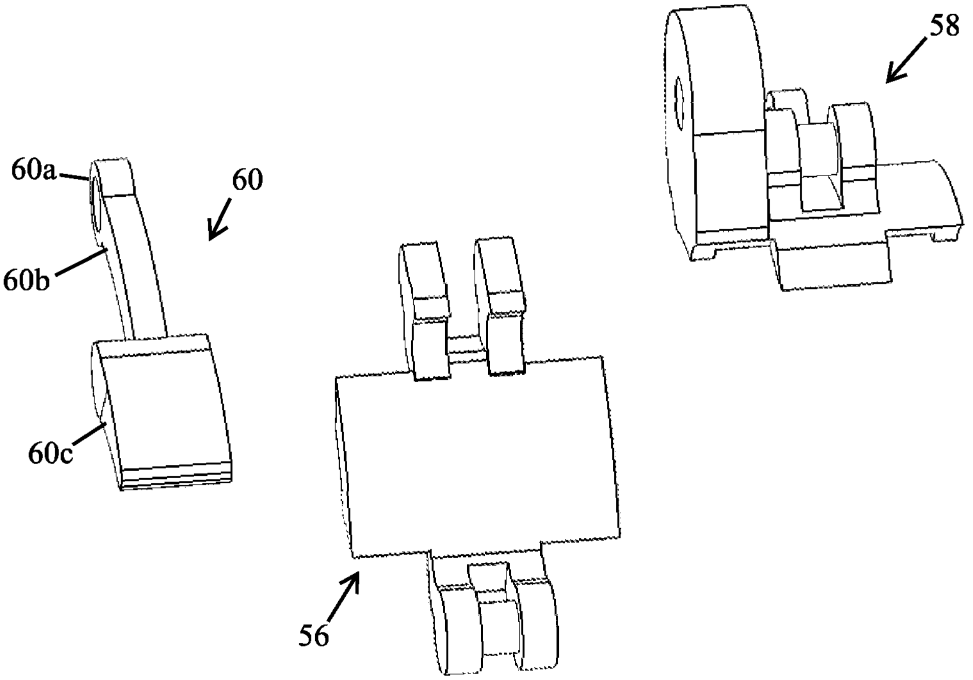
FIG. 38 is an exploded view of the lock structure of FIGS. 36 and 37.
Figure 39:
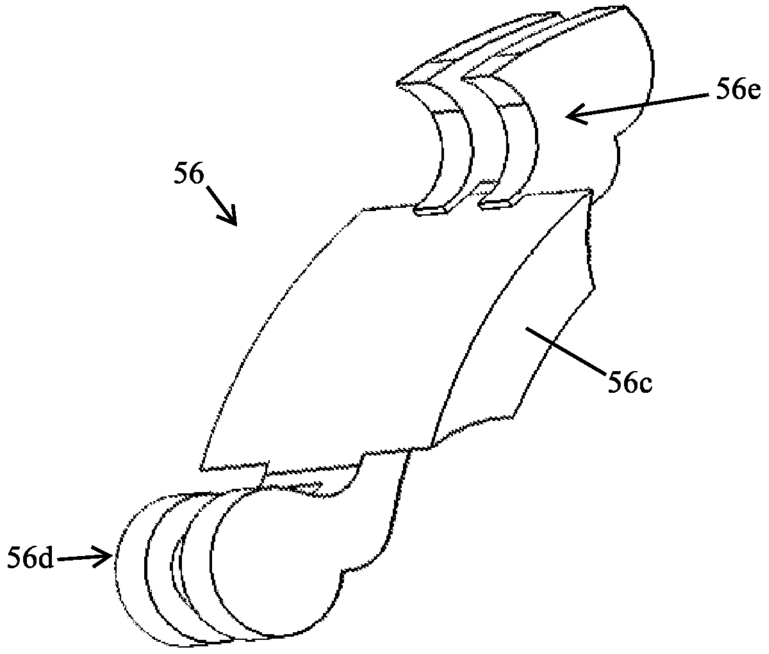
FIGS. 39 and 40 show a body component of the lock structure of FIG. 38 that has a lock surface for engaging a lock lever of the lock structure.
Figure 40:
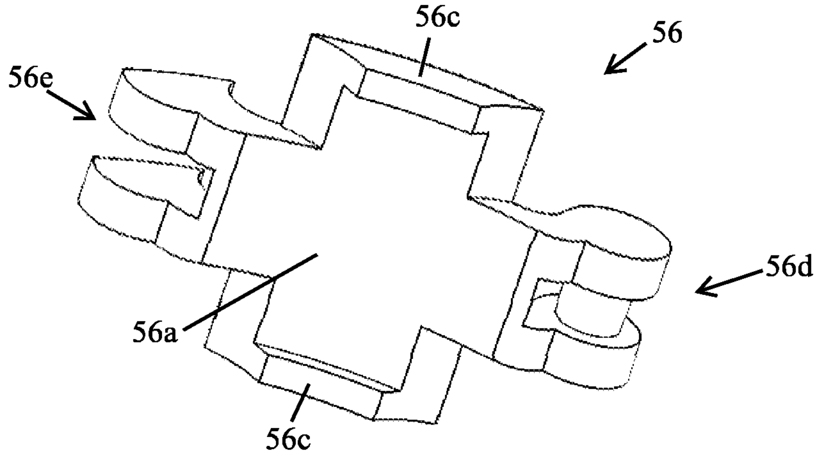
Figure 41:
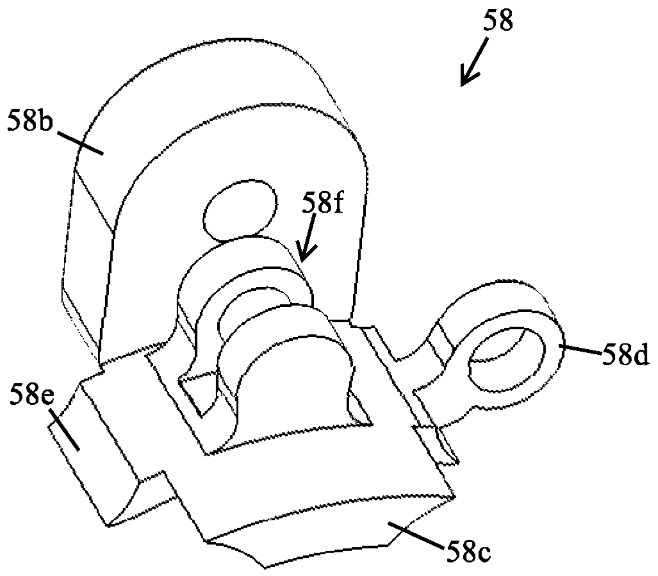
FIGS. 41 and 42 show a body component of the lock structure of FIG. 38 configured for having a lock lever hingedly mounted thereon.
Figure 42:
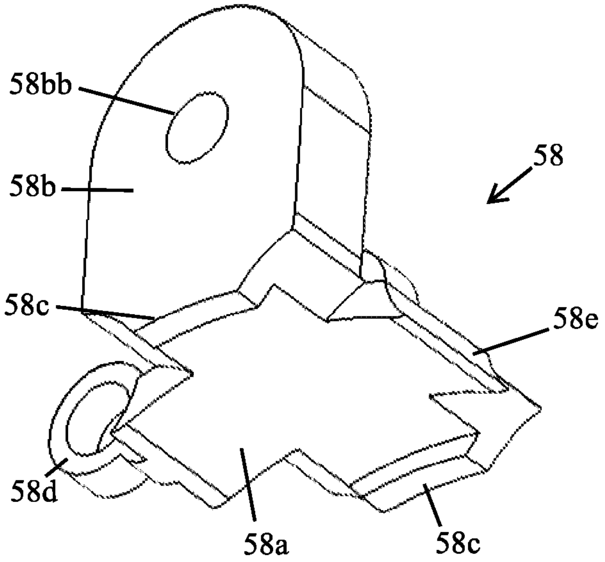

As described below, the implement positioner 50 enables the positioning of one or more implements, such as temperature gauges, pressure sensors and the like, generally represented as 62 in FIG. 28. The positioner 50 advantageously enables the positioning of one or more of the implements 62 at or closely adjacent the joint between the abutting flanges F.

The male body segments 52 include an inner concave surface 52*a*, an implement mount 52*b*, flange fingers 52*c*, and end mounts 52*d*. The segments 52 are substantially the same as the segments 12, except to not include a gasket finger, and to include two flange fingers 52*c* for locating at the intersection of abutting flanges along with the implement mount 52*b*. The implement mount 52*b* includes an aperture 52*bb* to mountably receive a threaded rod or other mating structure of one of the implements 62.

The female body segments 54 include an inner concave surface 54*a*, an implement mount 54*b*, flange fingers 54*c*, and end mounts 54*d*. The segments 54 are substantially the same as the segments 14, except to not include a gasket finger, and to include two flange fingers 54*c* for locating at the intersection of abutting flanges along with the implement mount 54*b*. The implement mount 54*b* includes an aperture 54*bb* to mountably receive a threaded rod or other mating structure of one of the implements 62.

The lock body segment 56 includes an inner concave surface 56*a*, flange fingers 56*c*, mount 56*d*, and a lock surface 56*e*. The segment 56 is substantially the same as the segment 16, except to not include a gasket finger, and to include two flange fingers 52*c* for locating at the intersection of abutting flanges.

The lock body segment 58 includes an inner concave surface 58*a*, an implement mount 58*b*, flange fingers 58*c*, mount 58*d*, a lock surface 58*e*, and a lever mount 58*f*. The segment 58 is substantially the same as the segment 18, except to not include a gasket finger, and to include two flange fingers 58*c* for locating at the intersection of abutting flanges along with the implement mount 58*b*. The implement mount 58*b* includes an aperture 58*bb* to mountably receive a threaded rod or other mating structure of one of the implements 62.

The lock lever 60 is elongate and corresponds to the lock lever 20 and includes a foot 60*a*, a trunk 60*b*, and a head 60*c*. As described in connection with the lock lever 20 and the lock body segments 16 and 18, the lock body segments 56 and 58 may be locked together with the lock lever 60.

The implement 62 may be optical gauges, temperature gauges, sensors, mirrors, cameras, heating devices, cooling devices, and the like. The implements may include adjustable connectors to interface with the implement mounts to further provide adjustment of the orientation or position of an implement relative to the joint.

In use, the implement positioner 50 is lockably installable around the abutting flanges F of the abutting tubes T to enable one or more of the implements 62 to be desirably positioned on one or more of the implement mounts at the joint between the abutting flanges. In the manner of the tool 10, the lock body segments 56 and 58 are locked together with the lock lever 60. The body segments 62 and 64 are located to surround the adjacent flanges F. One or more implements may be attached to the implement mounts to locate the implements adjacent the joint to monitor or otherwise collect data of the joint location.

In addition, the implement positioner 50 may be configured for use along a tube or the like not having flanges or not at a joint, so as to position implements at desired locations along a tube. To accomplish this the implement positioner 50 may be made as previously described, except the fingers 52*c*, 54*c*, 56*c*, and 58*c* would not be included. This configuration would advantageously be readily installable onto the outer surface of a tube or the like.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A flexible implement positioner securably positionable about a juncture of two abutting tubes having abutting flanges, the implement positioner comprising:

a plurality of body segments each having an inner concave surface hingedly connected to one another, a proximal one of the body segments having a lock surface and a distal one of the body segments having a lock lever hingedly mounted thereon, the lock lever being positionable in engagement with the lock surface and pivotal to lockably engage the lock lever with the lock surface, wherein the body segments include a first finger located adjacent a first side of the inner concave surface and extending perpendicular to and away from the inner concave surface, and a second finger located adjacent an opposite second side of the inner concave surface and extending perpendicular to and away from the inner concave surface parallel to and spaced apart from the first finger, the body segments being hingedly connected to one another with the first fingers aligned with one another and the second fingers aligned with one another, the first fingers configured for engaging one of the abutting flanges and the second fingers are configured for engaging the other one of the abutting flanges; and an implement mount extending outwardly from one or more of the body segments, wherein the implement positioner is installable around a cylindrical body by encircling the body segments around the abutting flanges of the abutting tubes with the inner concave surface of each body segment engageable with both of the flanges of the abutting tubes and the implement positioner is lockably secured around the abutting flanges by engaging the lock lever with the lock surface to secure the body segments about the abutting flanges with the implement mount extending outwardly from the abutting flanges.

2. The implement positioner of claim 1, wherein the abutting tubes comprise vacuum tubes and an implement is mounted on the implement mount, the implement comprising one or more of an optical gauge, a temperature gauge, a sensor, a mirror, a camera, a heating device, or a cooling device.

3. The implement positioner of claim 1, wherein the body segments are made of plastic and the implement positioner is made in an assembled state with the body segments connected together by printing the implement positioner with a three-dimensional printer comprising a print head for plastic and a print head for a support material, wherein after printing of the assembled implement positioner the assembled implement positioner is exposed to a solution to dissolve the support material.

4. The implement positioner of claim 1, wherein the implement mount extends from one of the first or second fingers in an opposite direction of the finger from which it extends.

* * * * *